United States Patent
Ohhashi

(10) Patent No.: US 12,141,936 B2
(45) Date of Patent: Nov. 12, 2024

(54) IMAGE PROCESSING APPARATUS, IMAGE PROCESSING METHOD, AND RECORDING MEDIUM

(71) Applicant: Socionext Inc., Kanagawa (JP)

(72) Inventor: Kazuyuki Ohhashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 378 days.

(21) Appl. No.: 17/825,781

(22) Filed: May 26, 2022

(65) Prior Publication Data
US 2022/0292629 A1 Sep. 15, 2022

Related U.S. Application Data

(63) Continuation of application No. PCT/JP2019/047286, filed on Dec. 3, 2019.

(51) Int. Cl.
G06T 3/00 (2024.01)
G06T 3/08 (2024.01)
G06T 3/14 (2024.01)
G06T 7/70 (2017.01)

(52) U.S. Cl.
CPC ............. G06T 3/08 (2024.01); G06T 3/14 (2024.01); G06T 7/70 (2017.01)

(58) Field of Classification Search
CPC .... G06T 1/00; G06T 3/00; G06T 3/08; G06T 3/14; G06T 7/70
See application file for complete search history.

(56) References Cited

U.S. PATENT DOCUMENTS

| | | | |
|---|---|---|---|
| 10,339,396 B2 * | 7/2019 | Ohizumi | ............... B60R 21/00 |
| 2014/0055487 A1 | 2/2014 | Kiyo et al. | |
| 2014/0139640 A1 | 5/2014 | Shimizu | |
| 2014/0375812 A1 | 12/2014 | Ehlgen et al. | |

FOREIGN PATENT DOCUMENTS

| | | | |
|---|---|---|---|
| JP | 2002-123829 A | 4/2002 | |
| JP | 2013-207637 A | 10/2013 | |
| JP | 5369465 B2 | 12/2013 | |
| JP | 2014-041398 A | 3/2014 | |
| JP | 2014-531078 A | 11/2014 | |
| WO | 2013/018173 A1 | 2/2013 | |

OTHER PUBLICATIONS

International Search Report (ISR) dated Mar. 3, 2020 issued in International Patent Application No. PCT/JP2019/043501, with English translation.
Environmental Recognition of Mobile Robot: Mapping and Localization system/control/information, (Journal of Institute of Systems, Control and Information Engineers), vol. 60, No. 12, pp. 509-514, 2016, with English translation of the relevant passages.

\* cited by examiner

*Primary Examiner* — Kent Yip
(74) *Attorney, Agent, or Firm* — Rimon P.C.

(57) ABSTRACT

An image processing apparatus is disclosed. The image processing apparatus includes a processor connected to a memory. The processor functions as a deformation unit. The deformation unit serves to deform a reference projection screen that is a projection screen of a surrounding image of a moving object. The reference projection screen is deformed by using position information in which detection points around the moving object are accumulated and using self-location information of the moving object.

12 Claims, 21 Drawing Sheets

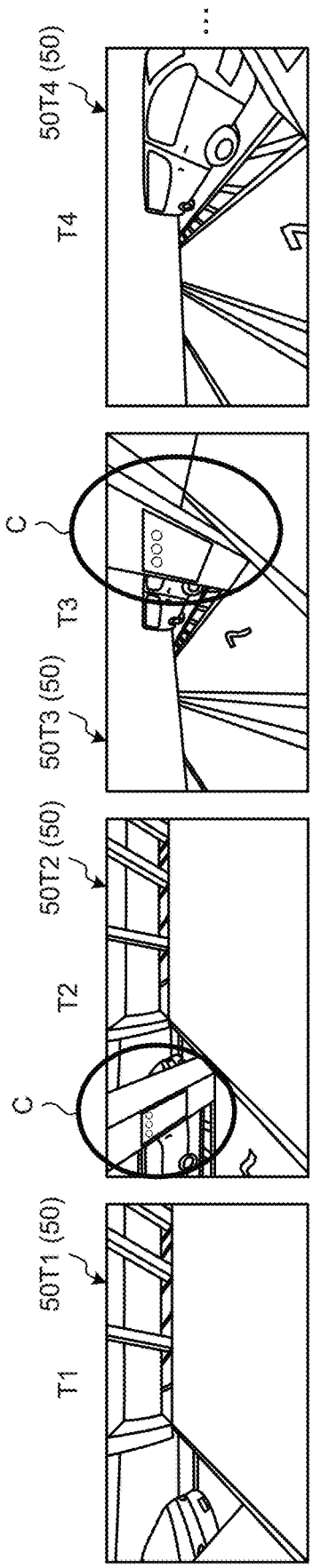

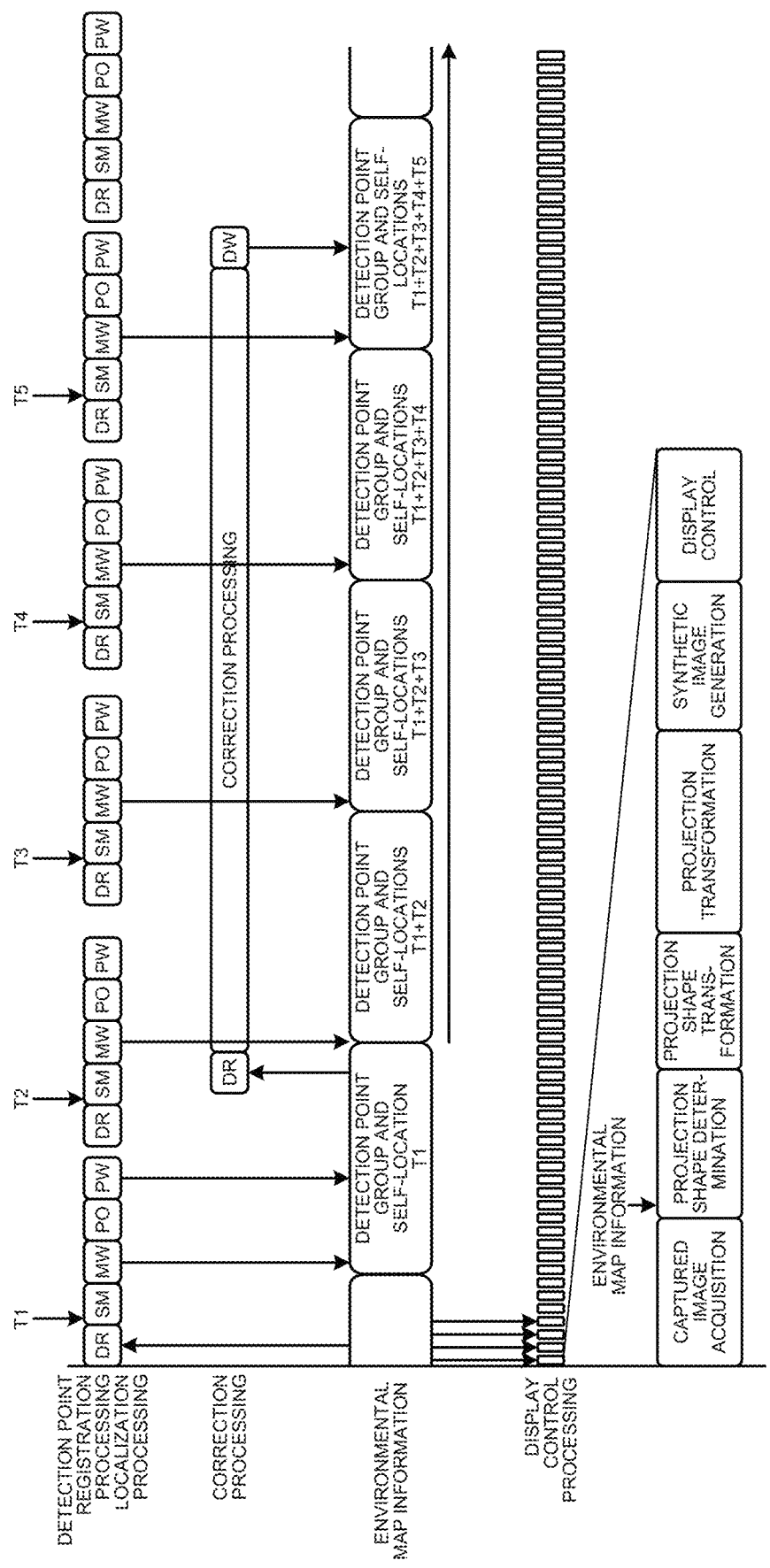

IMAGE PROCESSING APPARATUS, IMAGE PROCESSING METHOD, AND RECORDING MEDIUM

CROSS-REFERENCE TO RELATED APPLICATIONS

This application is a continuation of International Application No. PCT/JP2019/047286, filed on Dec. 3, 2019, the entire contents of which are incorporated herein by reference.

FIELD

The present disclosure relates generally to an image processing apparatus, an image processing method, and a recording medium.

BACKGROUND

There has been disclosed a technology of generating a synthetic image from an arbitrary viewpoint by using a projected image obtained by projecting captured images of the surrounding of a moving object onto a virtual projection screen. In addition, there has been disclosed a technology of detecting, by using a sensor, a distance between a moving object and an object around the moving object, and deforming the shape of a projection screen in accordance with the detected distance (for example, JP 2013-207637 A, JP 2014-531078 A, JP 5369465 B2, and "Environmental Recognition of Mobile Robot: Mapping and Localization" system/control/information (Journal of Institute of Systems, Control and Information Engineers), Vol. 60 No. 12, pp. 509-514, 2016).

However, in a case where a relative position of the object with respect to the moving object falls outside a detection region of the sensor, it becomes difficult to acquire a distance to the object. Thus, in the related art, it has become difficult to deform a projection screen in accordance with an object in some cases.

SUMMARY

An image processing apparatus according to one aspect of the present disclosure includes a processor connected to a memory. The processor is configured to function as a deformation unit. The deformation unit serves to deform a reference projection screen being a projection screen of a surrounding image of a moving object. The reference projection screen is deformed by using position information in which detection points around the moving object are accumulated and using self-location information of the moving object.

BRIEF DESCRIPTION OF THE DRAWINGS

FIG. 9A is a schematic diagram illustrating a captured image according to the first embodiment;

FIG. 9C is a schematic diagram illustrating a timing chart of image processing according to the first embodiment;

DETAILED DESCRIPTION

Hereinafter, embodiments of an image processing apparatus, an image processing method, and a recording medium disclosed by this application will be described in detail with reference to the drawings. Note that the following embodiments are not intended to limit the disclosed technology. In addition, the embodiments can be appropriately combined without generating contradiction in processing content.

First Embodiment

Figure 1:
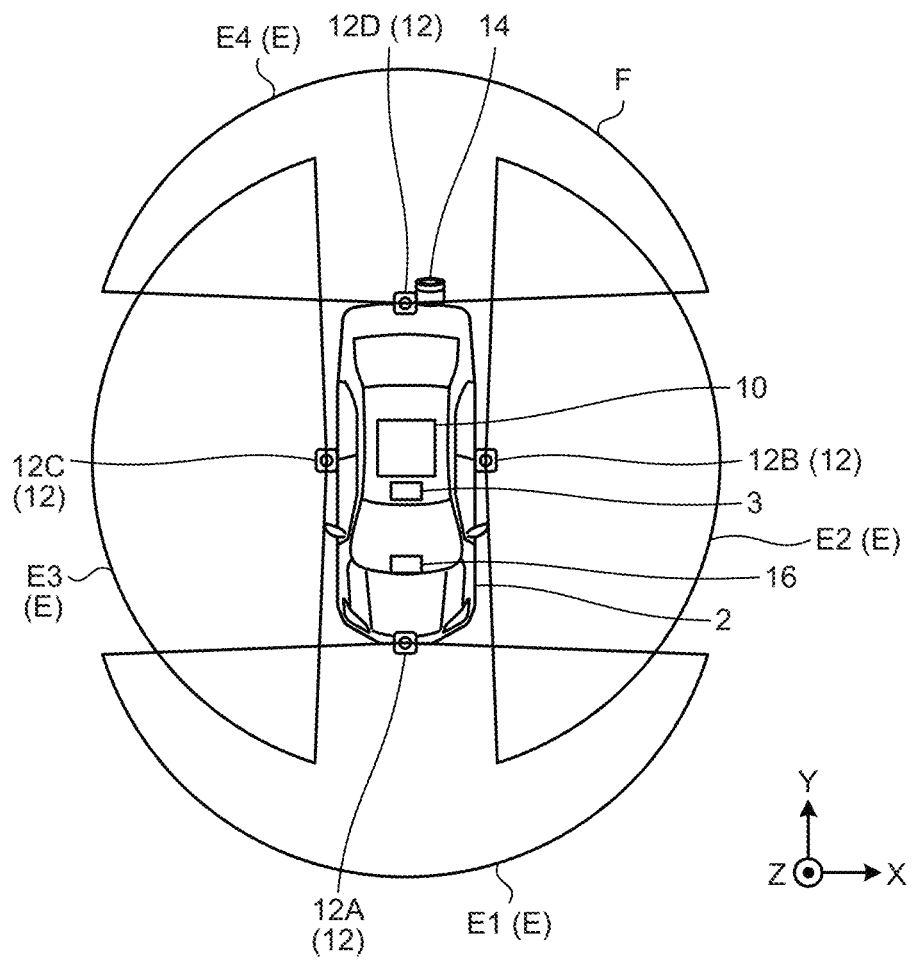
FIG. 1 is a diagram illustrating an overall configuration of an image processing system according to a first embodiment.

FIG. 1 is a diagram illustrating an example of an overall configuration of an image processing system 1 of the present embodiment. The image processing system 1 includes an image processing apparatus 10, an image capturing unit 12, a detector 14, and a display unit 16. The image processing apparatus 10, the image capturing unit 12, the detector 14, and the display unit 16 are connected in such a manner that data or signals can be communicated between them.

In the present embodiment, a configuration in which the image processing apparatus 10, the image capturing unit 12, the detector 14, and the display unit 16 are installed in a moving object 2 will be described as an example.

The moving object 2 is a mobile object. For example, the moving object 2 is a vehicle, a flyable object (manned airplane, unmanned airplane (for example, unmanned aerial vehicle (UAV); drone), a robot, or the like. In addition, for example, the moving object 2 is a moving object traveling via a driving operation performed by a human, or a moving object that can automatically travel (autonomous travel) not via a driving operation performed by a human. In the present embodiment, a case where the moving object 2 is a vehicle will be described as an example. The vehicle is a two-wheeled vehicle, a three-wheeled vehicle, or a four-wheeled vehicle, for example. In the present embodiment, a case where the vehicle is a four-wheeled vehicle that can autonomously travel will be described as an example.

Note that a configuration is not limited to a configuration in which all of the image processing apparatus 10, the image capturing unit 12, the detector 14, and the display unit 16 are installed in the moving object 2. The image processing apparatus 10 may be installed in a stationary object. The stationary object is an object fixed to the ground. The stationary object is an immobile object or an object that remains stationary on the ground. The stationary object is a traffic light, a parked vehicle, a traffic sign, or the like, for example. In addition, the image processing apparatus 10 may be installed in a cloud server that executes processing on a cloud.

The image capturing unit 12 captures an image of the surrounding of the moving object 2, and acquires captured image data. In the following description, the captured image data will be simply referred to as a captured image. The image capturing unit 12 is a digital camera, for example. Note that image capturing refers to converting an image of a subject that is formed by an optical system such as a lens, into an electrical signal. The image capturing unit 12 outputs a captured image obtained by image capturing, to the image processing apparatus 10.

In the present embodiment, a configuration in which four image capturing units 12 (image capturing units 12A to 12D) are installed in the moving object 2 will be described as an example. The image capturing units 12 (12A to 12D) capture images of subjects in respective image capturing regions E (E1 to E4), and acquire captured images. Note that image capturing directions of these image capturing units 12 are different from each other. Specifically, the image capturing directions of the image capturing units 12 are adjusted beforehand in such a manner that at least parts of the image capturing regions E do not overlap with each other.

The detector 14 detects position information of each of detection points around the moving object 2. In other words, the detector 14 detects position information of each of detection points in a detection region F. The detection point refers to each of the points in a real space, which are to be individually observed by the detector 14. For example, the detector 14 emits light to the surrounding of the detector 14, and receives reflected light reflected at a reflection point. Such a reflection point corresponds to a detection point.

The position information of a detection point is information indicating a position of a detection point in the real space (three-dimensional space). For example, position information of a detection point is information indicating a distance between the detector 14 (that is, the position of the moving object 2) and the detection point, and also indicating a direction of the detection point with respect to the detector 14. The distance and the direction can be represented by, for example, position coordinates indicating a relative position of the detection point with respect to the detector 14, position coordinates indicating an absolute position of the detection point, or vectors.

The detector 14 (an example of the detector device) is a Three-Dimensional (3D) scanner, a Two-Dimensional (2D) scanner, a distance sensor (millimeter-wave radar or laser sensor), a sonar sensor that detects an object by sound waves, an ultrasonic sensor, or the like, for example. A laser sensor is a three-dimensional Laser Imaging Detection and Ranging (LIDAR) sensor, for example. In addition, the detector 14 may be a device using a Structure from Motion (SfM) technology that measures a distance on the basis of an image captured by a monocular camera.

The display unit 16 displays various types of information. The display unit 16 is a Liquid Crystal Display (LCD), an organic Electro-Luminescence (EL) display, or the like, for example.

In the present embodiment, the image processing apparatus 10 is connected to an Electronic Control Unit (ECU) 3 installed in the moving object 2, in such a manner that communication can be performed. The ECU 3 is a unit that performs electronic control of the moving object 2. In the present embodiment, the image processing apparatus 10 can receive Controller Area Network (CAN) data such as a speed and a moving direction of the moving object 2 from the ECU 3.

Figure 2:
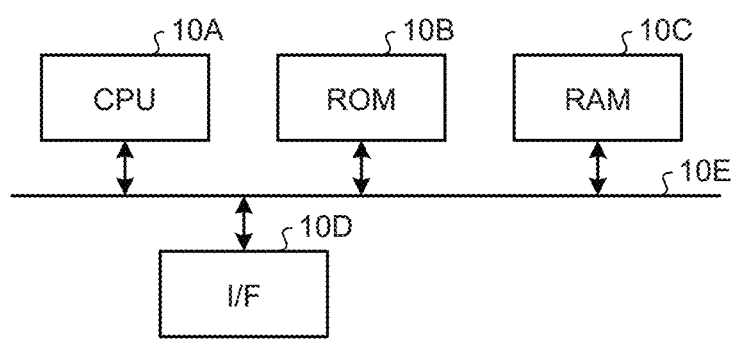
FIG. 2 is a diagram illustrating a hardware configuration of an image processing apparatus according to the first embodiment.

Next, a hardware configuration of the image processing apparatus 10 will be described. FIG. 2 is a diagram illustrating an example of a hardware configuration of the image processing apparatus 10.

The image processing apparatus 10 includes a Central Processing Unit (CPU) 10A, a Read Only Memory (ROM) 10B, a Random Access Memory (RAM) 10C, and an Interface (I/F) 10D, and is a computer, for example. The CPU 10A, the ROM 10B, the RAM 10C, and the I/F 10D are connected to each other via a bus 10E, and constitute a hardware configuration using a normal computer.

The CPU 10A (an example of the processor) is an arithmetic device that controls the image processing apparatus 10. The CPU 10A corresponds to an example of a processor. The ROM 10B stores programs for implementing various types of processing to be executed by the CPU 10A. The RAM 10C stores data necessary for various types of processing to be executed by the CPU 10A. The I/F 10D is an interface for connecting to the image capturing unit 12, the detector 14, the display unit 16, the ECU 3, and the like, and transmitting and receiving data.

Computer programs for executing image processing, which are to be executed by the image processing apparatus 10 of the present embodiment, are provided by being pre-installed in the ROM 10B or the like. Note that the programs to be executed by the image processing apparatus 10 of the present embodiment may be provided by being recorded on a recording medium in a file format installable onto or executable by the image processing apparatus 10. The recording medium is a non-transitory computer-readable recording medium. The recording medium may be a Compact Disc (CD)-ROM, a flexible disk (FD), a CD-Recordable (R), a Digital Versatile Disk (DVD), a Universal Serial Bus (USB) memory, a Secure Digital (SD) card, or the like.

Figure 3:
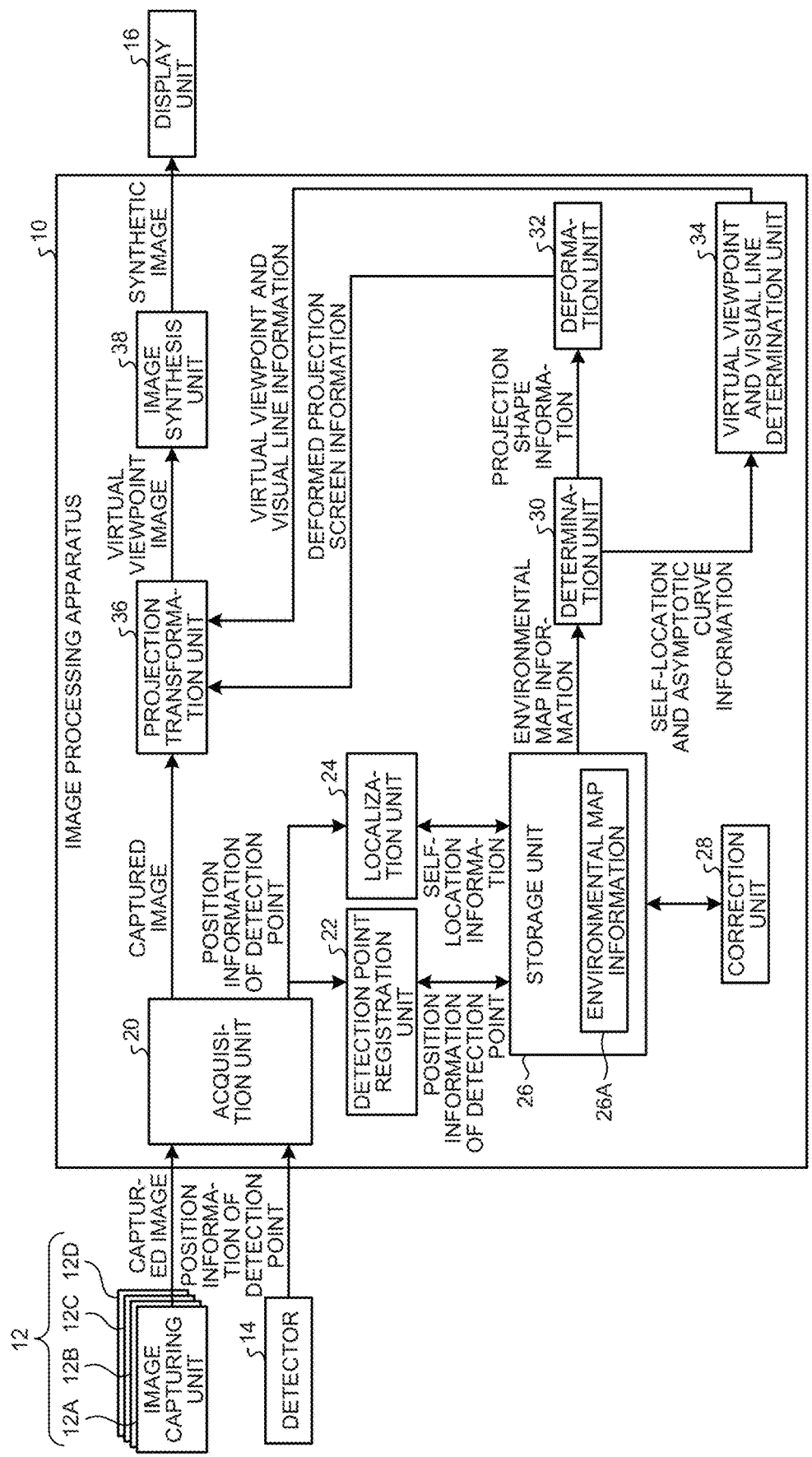
FIG. 3 is a diagram illustrating a functional configuration of the image processing apparatus according to the first embodiment.

Next, a functional configuration of the image processing apparatus 10 will be described. FIG. 3 is a diagram illustrating an example of a functional configuration of the image processing apparatus 10. Note that, for clarifying an input-output relationship of data, FIG. 3 also illustrates the image capturing unit 12, the detector 14, and the display unit 16 in addition to the image processing apparatus 10.

The image processing apparatus 10 includes an acquisition unit 20, a detection point registration unit 22, a localization unit 24, a storage unit 26, a correction unit 28, a determination unit 30, a deformation unit 32, a virtual viewpoint and visual line determination unit 34, a projection transformation unit 36, and an image synthesis unit 38.

Part of or all the above-described units may be implemented by causing a processing device such as the CPU 10A to execute programs. That is, part of or all the above-described units may be implemented by software. Alternatively, part of or all the above-described units may be implemented by hardware such as one or more Integrated Circuits (ICs), or may be implemented by the combination of software and hardware.

The acquisition unit 20 acquires a captured image from the image capturing unit 12. In addition, the acquisition unit 20 acquires position information of a detection point from the detector 14. The acquisition unit 20 acquires a captured image from each of the image capturing units 12 (image capturing units 12A to 12D). The detector 14 detects position information of each of detection points. Thus, the acquisition unit 20 acquires position information of each of detection points, and a captured image obtained by each of the image capturing units 12.

Each time when the acquisition unit 20 acquires position information of each of detection points, the acquisition unit 20 outputs the acquired position information to the detection point registration unit 22 and the localization unit 24. In addition, each time when the acquisition unit 20 acquires a captured image, the acquisition unit 20 outputs the acquired captured image to the projection transformation unit 36.

Each time when the detection point registration unit 22 acquires position information of each of detection points, the detection point registration unit 22 registers each piece of the acquired position information into environmental map information 26A. The environmental map information 26A is stored in the storage unit 26.

The storage unit 26 stores various types of data. The storage unit 26 is a RAM, a semiconductor memory device such as a flash memory, a hard disk, an optical disk, or the like, for example. Note that the storage unit 26 may be a storage device provided outside the image processing apparatus 10. In addition, the storage unit 26 may be a storage medium. Specifically, the storage medium may be a storage medium storing or temporarily storing computer programs and various types of information downloaded over a Local Area Network (LAN), the Internet, or the like.

The environmental map information 26A is map information indicating a surrounding situation of the moving object 2. The environmental map information 26A is information obtained by registering position information of each detection point and self-location information of the moving object 2 into a three-dimensional coordinate space having an origin set to a predetermined position in the real space. The predetermined position in the real space may be defined on the basis of a preset condition.

The predetermined position is, for example, a position of the moving object 2 when the image processing apparatus 10 executes image processing of the present embodiment. For example, it is assumed that image processing is executed at a predetermined timing such as a parking scene of the moving object 2. In this case, the image processing apparatus 10 may recognize, as the predetermined position, a position of the moving object 2 when it is determined that the predetermined timing has come. For example, when it is determined that a behavior of the moving object 2 becomes a behavior indicating a parking scene, the image processing apparatus 10 may determine that the predetermined timing has come. The behavior indicating a parking scene is, for example, a case where a speed of the moving object 2 becomes equal to or smaller than a predetermined speed, a case where a gear of the moving object 2 is set to a reverse gear, a case where a signal indicating a parking start is received by an operation instruction issued by a user, and the like. Note that the predetermined timing is not limited to the parking scene.

Figure 4:
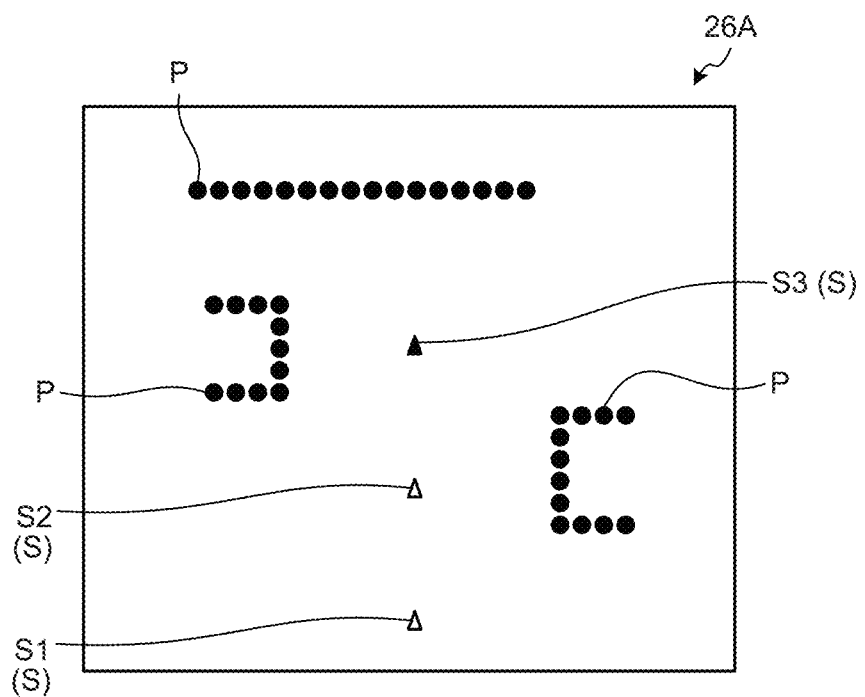
FIG. 4 is a schematic diagram of environmental map information according to the first embodiment.

FIG. 4 is a schematic diagram of an example of the environmental map information 26A. The environmental map information 26A is information obtained by registering position information of each of detection points P and self-location information of a self-location S of the moving object 2 into corresponding coordinate positions in the three-dimensional coordinate space.

Each time when the detection point registration unit 22 acquires position information of the detection point P from the detector 14 via the acquisition unit 20, the detection point registration unit 22 identifies the same detection point P registered in the environmental map information 26A, by scan matching. The same detection point P means the same detection point P in the real space that has a different acquisition timing of position information acquired by the detector 14. Out of pieces of position information of detection points P acquired from the detector 14, the detection point registration unit 22 additionally registers, into the environmental map information 26A, position information of the detection point P that is unregistered in the environmental map information 26A. At this time, the detection point registration unit 22 converts a coordinate of position information of the acquired detection point P into a coordinate having an origin set to the above-described predetermined position, and then registers the position information into the environmental map information 26A.

Note that, as a result of scan matching performed by the detection point registration unit 22, detection points P already-registered in the environmental map information 26A and newly-acquired detection points P do sometimes not coincide with each other at a predetermined percentage or more. In this case, the detection point registration unit 22 may discard position information of the newly-acquired detection points P and omit the registration into the environmental map information 26A. The predetermined percentage may be predefined. By this processing, reliability of the environmental map information 26A can be enhanced.

The detection point registration unit 22 preferably registers various parameters, which were used in the calculation of position information of the detection point P, into the environmental map information 26A together with the position information.

Referring back to FIG. 3, the description will be continued. The localization unit 24 estimates self-location information indicating the self-location S of the moving object 2, on the basis of position information of each of the detection points P registered in the environmental map information 26A. Then, the localization unit 24 registers the estimated self-location information of the self-location S into the environmental map information 26A.

The self-location information is information indicating the orientation of the moving object 2. The orientation of the moving object 2 indicates the position and inclination of the moving object 2.

Using position information of each of the detection points P registered in the environmental map information 26A, and position information of each of the latest detection points P acquired from the detector 14 via the acquisition unit 20, the localization unit 24 identifies corresponding detection points P included in these pieces of position information. The corresponding detection points P mean the same detection points P in the real space that have different acquisition timings of position information acquired by the detector 14. The localization unit 24 calculates self-location information of the self-location S of the moving object 2 by triangulation using position information of each of the identified corresponding detection points P. Then, the localization unit 24 registers the calculated self-location information into the environmental map information 26A.

Accordingly, position information of a new detection point P and self-location information of the self-location S are additionally registered into the environmental map information 26A in accordance with the movement of the moving object 2. In FIG. 4, self-locations S including self-locations S1 to S3 are illustrated as an example. A larger in numerical value following "S" represents a self-location S closer to the current timing.

Note that the localization unit 24 may estimate self-location information by using odometry. In this case, the localization unit 24 estimates new self-location information through integration calculation of the odometry by using self-location information calculated last time and a moving amount of the moving object 2. Note that the localization unit 24 may acquire the moving amount by reading a moving amount of the moving object 2 that is included in CAN data acquired from the ECU 3.

In this manner, in the present embodiment, the image processing apparatus 10 simultaneously executes registration of position information of the detection point P into the environmental map information 26A, and estimation of self-location information of the moving object 2 by Simultaneous Localization and Mapping (SLAM).

The correction unit 28 corrects position information of each of the detection points P and self-location information of the moving object 2, which are registered in the environmental map information 26A. The correction unit 28 corrects position information and self-location information registered in the environmental map information 26A, by using position information of each of the corresponding detection points P that have been acquired at an acquisition timing later than an acquisition timing of the detection point P.

In other words, the correction unit 28 corrects position information of the detection point P registered in the environmental map information 26A, using position information of the corresponding detection point P that has been detected again by the detector 14. At this time, the correction unit 28 may correct position information and self-location information further using various parameters used in the calculation of position information of each of the detection points P and registered in the environmental map information 26A. By the correction processing, the correction unit 28 calibrates an error of position information of the detection point P registered in the environmental map information 26A. The correction unit 28 may correct position information of the detection point P registered in the environmental map information 26A, by using a least-square method or the like. By the correction processing performed by the correction unit 28, an accumulated error of position information of the detection point P is corrected.

The timing of correction processing performed by the correction unit 28 is not limited. For example, the correction unit 28 may execute the above-described correction processing at every predetermined timing. The predetermined timing may be defined on the basis of a preset condition, for example. Note that, in the present embodiment, a case where the image processing apparatus 10 has a configuration including the correction unit 28 will be described as an example. Nevertheless, the image processing apparatus 10 may have a configuration not including the correction unit 28.

Next, the determination unit 30 will be described. The determination unit 30 determines a projection shape of a projection screen by using the environmental map information 26A. In other words, the determination unit 30 determines a projection shape of a projection screen by using position information of the detection points P accumulated in the environmental map information 26A.

The projection screen is a three-dimensional plane for projecting a surrounding image of the moving object 2. The projection shape of the projection screen is a three-dimensional (3D) shape virtually formed in a virtual space corresponding to the real space.

The surrounding image of the moving object 2 is a captured image of the surrounding of the moving object 2. In the present embodiment, the surrounding image of the moving object 2 is a captured image obtained captured by each of the image capturing units 12A to 12D.

In the present embodiment, the determination unit 30 determines, as a projection shape, a shape obtained by deforming a reference projection screen in accordance with position information of the detection point P registered in the environmental map information 26A.

Figure 5A:
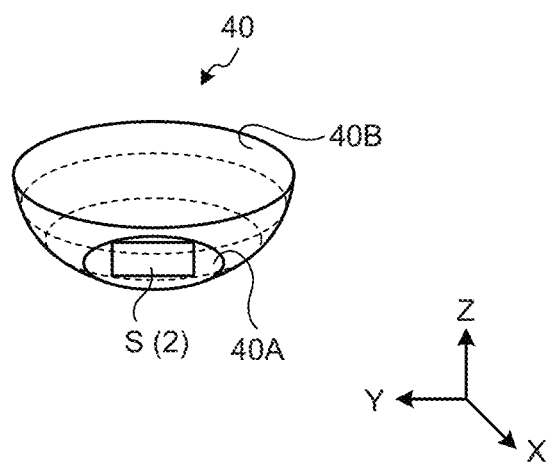
FIG. 5A is a schematic diagram illustrating a reference projection screen according to the first embodiment.

FIG. 5A is a schematic diagram illustrating an example of a reference projection screen 40. The reference projection screen 40 is a projection screen with a reference shape in changing the shape of a projection screen, for example. The shape of the reference projection screen 40 is a bowl shape, a cylindrical shape, or the like, for example.

The bowl shape refers to a shape having a bottom surface 40A and a sidewall surface 40B. One end of the sidewall surface 40B is combined with the bottom surface 40A, and the other end is opened. A width of a horizontal section of the sidewall surface 40B becomes larger from the bottom surface 40A side toward an opened side of the other end. The bottom surface 40A has a circular shape, for example. Examples of the circular shape include a true circle shape, and a circular shape other than the true circle shape, such as an ellipsoidal shape. The horizontal section is an orthogonal plane orthogonal to a vertical direction (arrow Z direction). The orthogonal plane is a two-dimensional plane extending in an arrow X direction and an arrow Y direction. The arrow X direction is orthogonal to the arrow Z direction. The arrow Y direction is orthogonal to the arrow Z direction and the arrow X direction. The horizontal section and the orthogonal plane will each be referred to as an XY plane in the following description. Note that the bottom surface 40A may have a shape other than a circular shape such as an oval shape, for example.

The cylindrical shape refers to a shape including a bottom surface 40A with a circular shape and a sidewall surface 40B combined with the bottom surface 40A. The sidewall surface 40B forming the reference projection screen 40 with a cylindrical shape has a cylinder shape in which an opening of one end portion is combined with the bottom surface 40A and the other end is opened. Note that the sidewall surface 40B forming the reference projection screen 40 with a cylindrical shape has a shape with a substantially-constant diameter of the XY plane from the bottom surface 40A side toward an opening side of the other end. The bottom surface 40A may have a shape other than a circular shape, such as an oval shape, for example.

In the present embodiment, a case where the shape of the reference projection screen 40 is a bowl shape will be described as an example. The reference projection screen 40 is a three-dimensional model virtually formed in a virtual space in which the bottom surface 40A is set as a surface substantially coinciding with a road surface existing below the moving object 2, and the center of the bottom surface 40A is set as a self-location S of the moving object 2.

The determination unit 30 determines, as a projection shape, a shape obtained by deforming the reference projection screen 40 into a shape passing through a detection point P closest to the moving object 2. The shape passing through the detection point P means a shape in which the deformed sidewall surface 40B passes through the detection point P.

Figure 5B:
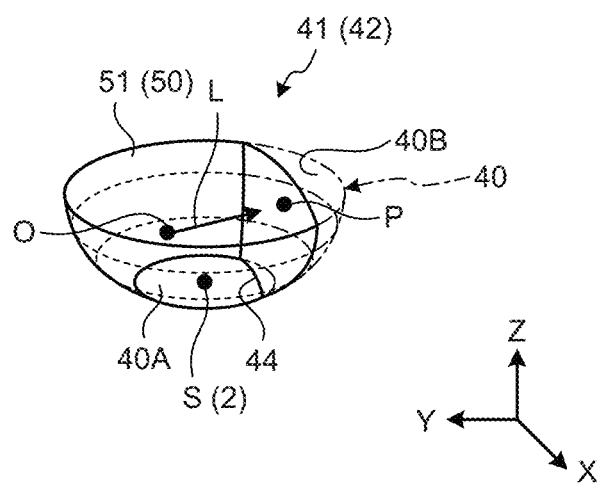
FIG. 5B is a schematic diagram illustrating a projection shape according to the first embodiment.

FIG. 5B is a schematic diagram illustrating an example of a projection shape 41. The determination unit 30 determines, as the projection shape 41, a shape obtained by deforming the reference projection screen 40 into a shape passing through a detection point P closest to the self-location S of the moving object 2 being a center of the bottom surface 40A of the reference projection screen 40. The self-location S is the latest self-location S calculated by the localization unit 24.

The determination unit 30 identifies the detection point P closest to the self-location S from among detection points P registered in the environmental map information 26A. More specifically, XY coordinates of a center position (self-location S) of the moving object 2 are set to $(X, Y) = (0, 0)$. Then, the determination unit 30 identifies the detection point P having the minimum value of $X^2 + Y^2$, as the detection point P closest to the self-location S. Then, the determination unit 30 determines, as the projection shape 41, a shape obtained by deforming the reference projection screen 40 into a shape in which the sidewall surface 40B of the reference projection screen 40 passes through the detection point P.

Specifically, the determination unit 30 determines, as the projection shape 41, a shape obtained by deforming partial regions of the bottom surface 40A and the sidewall surface 40B in such a manner that the partial region of the sidewall surface 40B becomes a wall surface passing through the detection point P closest to the moving object 2, when the reference projection screen 40 is deformed. The deformed projection shape 41 becomes a shape rising up from a rising line 44 on the bottom surface 40A toward a direction getting closer to the center of the bottom surface 40A, for example. The rising up means bending or folding partial regions of the sidewall surface 40B and the bottom surface 40A toward a direction getting closer to the center of the bottom surface 40A in such a manner that an angle formed by the sidewall surface 40B and the bottom surface 40A of the reference projection screen 40 becomes a smaller angle, for example.

The determination unit 30 determines to deform a specific region in the reference projection screen 40 in such a manner as to protrude to a position passing through the detection point P in a viewpoint on the XY plane (planar view). The shape and the range of the specific region may be determined on the basis of predefined standards. Then, the determination unit 30 determines to deform the shape of the reference projection screen 40 in such a manner that a distance from the self-location S continuously becomes farther from the protruded specific region toward a region on the sidewall surface 40B that is other than the specific region.

More specifically, as illustrated in FIG. 5B, it is preferable to determine the projection shape 41 in such a manner that an outer circumferential shape of a cross section extending along the XY plane becomes a curved shape. Note that the outer circumferential shape of the cross section of the projection shape 41 is a circular shape, for example, but may be a shape other than a circular shape.

Note that the determination unit 30 may determine, as the projection shape 41, a shape obtained by deforming the reference projection screen 40 into a shape corresponding to an asymptotic curve. The asymptotic curve is an asymptotic curve of detection points P. The determination unit 30 generates an asymptotic curve of a predetermined number of detection points P toward a direction getting away from the detection point P closest to the self-location S of the moving object 2. The number of the detection points P may be plural. For example, the number of the detection points P is preferably three or more. In addition, in this case, the determination unit 30 preferably generates an asymptotic curve of detection points P existing at positions distant by a predetermined angle or more when viewed from the self-location S.

Figure 6:
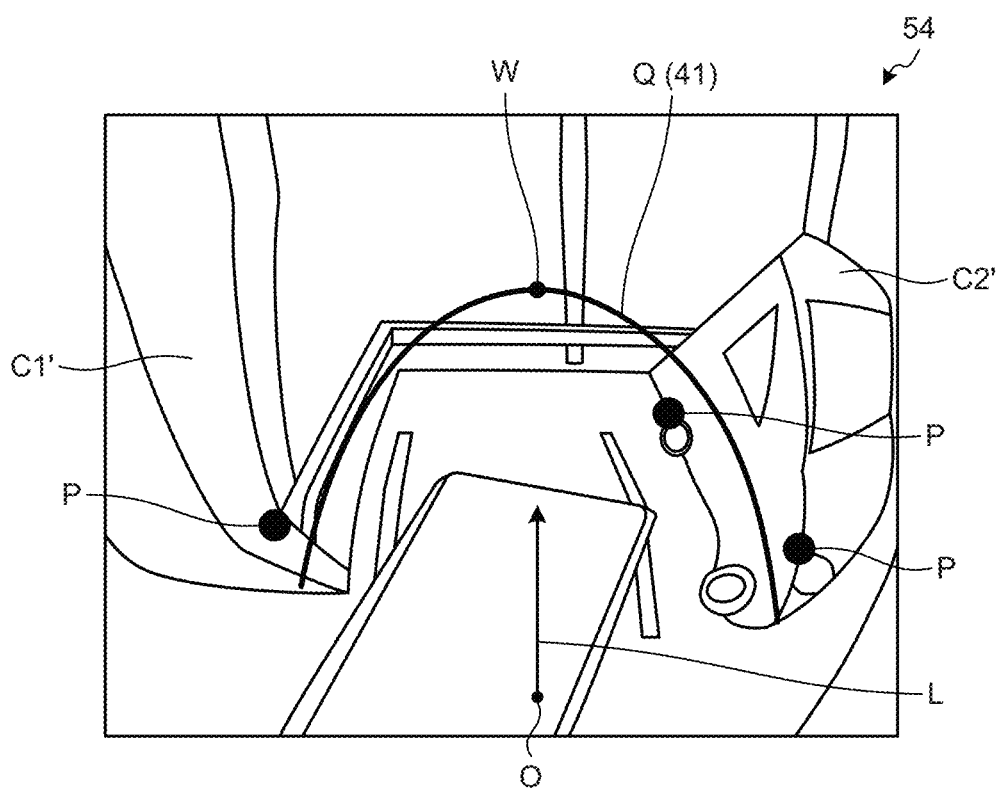
FIG. 6 is an explanatory diagram of an asymptotic curve according to the first embodiment.

FIG. 6 is an explanatory diagram of an asymptotic curve Q. FIG. 6 illustrates an example in which the asymptotic curve Q indicated in a projected image 51 obtained by projecting a captured image onto a projection screen in a case where the moving object 2 is viewed from above. For example, it is supposed that the determination unit 30 has identified three detection points P in order near from the self-location S of the moving object 2. In this case, the determination unit 30 generates the asymptotic curve Q of these three detection points P. Then, the determination unit 30 may determine, as the projection shape 41, a shape obtained by deforming the reference projection screen 40 into a shape corresponding to the generated asymptotic curve Q.

Note that the determination unit 30 may separate the surrounding of the self-location S of the moving object 2 at every specific angle range, and identify a detection point P closest to the moving object 2, or detection points P in order near from the moving object 2, for each of the angle ranges. Then, the determination unit 30 may determine, as the projection shape 41, a shape obtained by deforming the reference projection screen 40 into a shape passing through the identified detection point P, or a shape corresponding to the asymptotic curve Q of the identified detection points P, for each of the angle ranges.

Next, an example of a detailed configuration of the determination unit 30 will be described.

Figure 7:
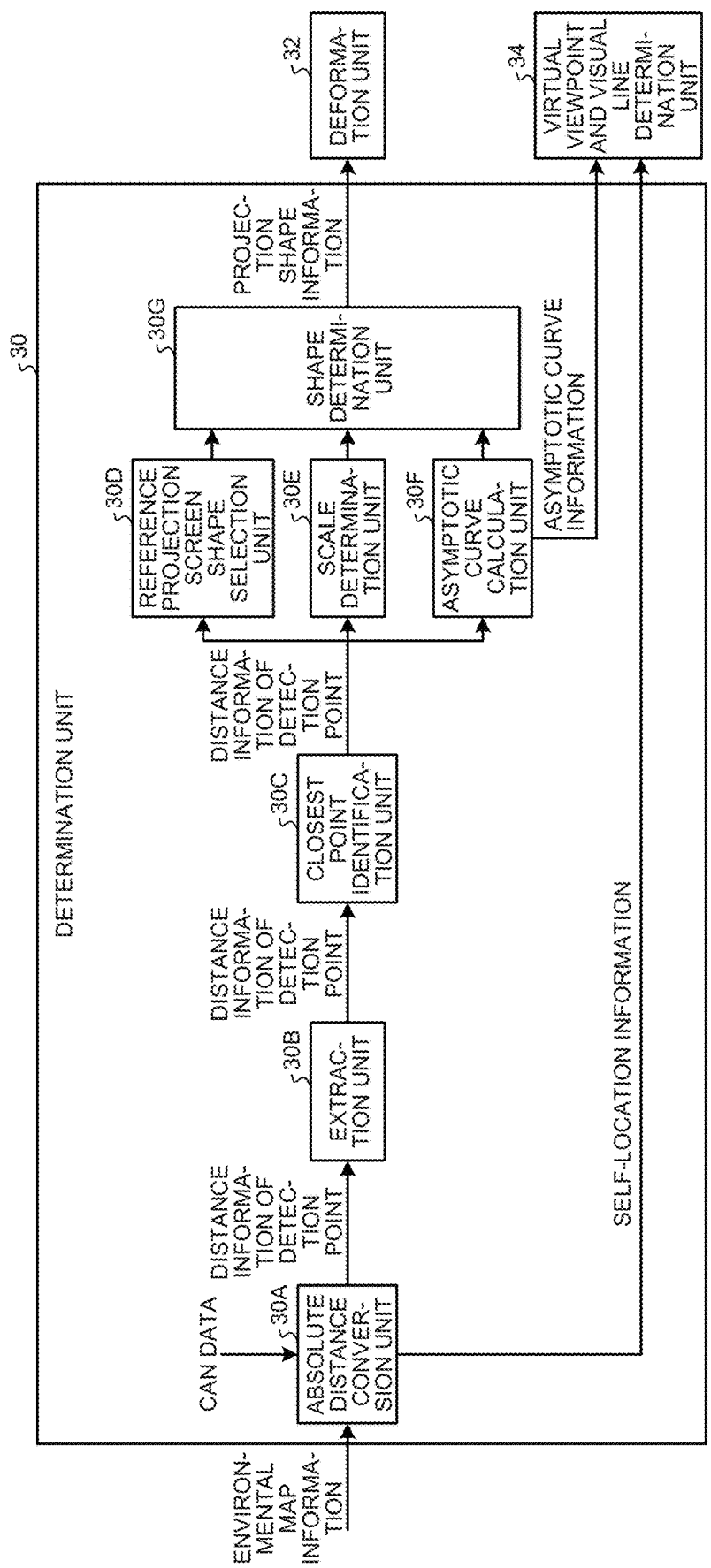
FIG. 7 is a schematic diagram illustrating a functional configuration of a determination unit according to the first embodiment.

FIG. 7 is a schematic diagram illustrating an example of a configuration of the determination unit 30. The determination unit 30 includes an absolute distance conversion unit 30A, an extraction unit 30B, a closest point identification unit 30C, a reference projection screen shape selection unit 30D, a scale determination unit 30E, an asymptotic curve calculation unit 30F, and a shape determination unit 30G.

The absolute distance conversion unit 30A reads the environmental map information 26A from the storage unit 26. The absolute distance conversion unit 30A converts position information of each of the detection points P included in the read environmental map information 26A, into distance information indicating an absolute distance to each of the detection points P from the current position being the latest self-location S of the moving object 2. Note that, in a case where the detector 14 acquires distance information of the detection point P, the absolute distance conversion unit 30A may be omitted.

More specifically, the absolute distance conversion unit 30A calculates the current position of the moving object 2 by using speed data of the moving object 2 that is included in CAN data received from the ECU 3 of the moving object 2.

Specifically, for example, the absolute distance conversion unit 30A calculates a distance between self-locations S registered in the environmental map information 26A, by using speed data of the moving object 2 that is included in CAN data. For example, the environmental map information 26A illustrated in FIG. 4 is supposed. In this case, the absolute distance conversion unit 30A calculates a distance between the self-location S1 and the self-location S2, and a distance between the self-location S2 and the self-location S3 by using speed data included in CAN data. Then, the absolute distance conversion unit 30A calculates the current position of the moving object 2 by using these distances.

Then, the absolute distance conversion unit 30A calculates distance information indicating a distance between the current position of the moving object 2 and each of detection points P included in the environmental map information 26A. More specifically, the absolute distance conversion unit 30A converts position information of each of the detection points P included in the environmental map information 26A into distance information from the current position of the moving object 2. By this processing, the absolute distance conversion unit 30A calculates distance information indicating an absolute distance of each of the detection points P.

Then, the absolute distance conversion unit 30A outputs the calculated distance information of each of detection points P to the extraction unit 30B. In addition, the absolute distance conversion unit 30A outputs the calculated current position of the moving object 2 to the virtual viewpoint and visual line determination unit 34 as self-location information of the moving object 2.

The extraction unit 30B extracts detection points P existing within a specific range, from among the detection points P of which distance information has been received from the absolute distance conversion unit 30A. The specific range is, for example, a range from the road surface, on which the moving object 2 is located, to a height corresponding to a vehicle height of the moving object 2. Note that the range is not limited to this example.

By extracting the detection points P existing within the range, the extraction unit 30B can extract the detection points P of an object disturbing the traveling of the moving object 2.

Then, the extraction unit 30B outputs distance information of each of the extracted detection points P to the closest point identification unit 30C.

The closest point identification unit 30C separates the surrounding of the self-location S of the moving object 2 at every specific angle range and identifies a detection point P closest to the moving object 2, or identifies detection points P in order near from the moving object 2, for each of the angle ranges. The closest point identification unit 30C identifies the detection point P by using the distance information received from the extraction unit 30B. In the present embodiment, a configuration in which the closest point identification unit 30C identifies detection points P in order near from the moving object 2 for each angle range will be described as an example.

The closest point identification unit 30C outputs distance information of the detection point P identified for each angle range, to the reference projection screen shape selection unit 30D, the scale determination unit 30E, and the asymptotic curve calculation unit 30F.

The reference projection screen shape selection unit 30D selects a shape of the reference projection screen 40. The reference projection screen shape selection unit 30D selects the shape of the reference projection screen 40 by reading a specific one shape from the storage unit 26 storing multiple types of shapes of the reference projection screen 40. For example, the reference projection screen shape selection unit 30D selects the shape of the reference projection screen 40 on the basis of a positional relationship between a self-location and a surrounding three-dimensional object, and distance information thereof. Note that the shape of the reference projection screen 40 may be selected in accordance with an operation instruction issued by the user. The reference projection screen shape selection unit 30D outputs determined shape information of the reference projection screen 40 to the shape determination unit 30G. In the present embodiment, as described above, a configuration in which the reference projection screen shape selection unit 30D selects the reference projection screen 40 with a bowl shape will be described as an example.

The scale determination unit 30E determines a scale of the reference projection screen 40 with the shape selected by the reference projection screen shape selection unit 30D. The scale determination unit 30E makes a determination of reducing a scale in a case where detection points P exist within a range of a predetermined distance from the self-location S. The scale determination unit 30E outputs scale information of the determined scale to the shape determination unit 30G.

The asymptotic curve calculation unit 30F outputs, to the shape determination unit 30G and the virtual viewpoint and visual line determination unit 34, asymptotic curve information of the asymptotic curve Q calculated by using each piece of distance information of the detection point P closest to the self-location S for each angle range from the self-location S that has been received from the closest point identification unit 30C. Note that the asymptotic curve calculation unit 30F may calculate the asymptotic curve Q of the detection points P accumulated for each plural portions of the reference projection screen 40. Then, the asymptotic curve calculation unit 30F may output asymptotic curve information of the calculated asymptotic curve Q to the shape determination unit 30G and the virtual viewpoint and visual line determination unit 34.

The shape determination unit 30G expands or reduces the reference projection screen 40 with the shape indicated by the shape information received from the reference projection screen shape selection unit 30D, into the scale indicated by the scale information received from the scale determination unit 30E. Then, the shape determination unit 30G determines, as the projection shape 41, a shape obtained by deforming the expanded or reduced reference projection screen 40 into a shape corresponding to the asymptotic curve information of the asymptotic curve Q received from the asymptotic curve calculation unit 30F.

Then, the shape determination unit 30G outputs projection shape information of the determined projection shape 41 to the deformation unit 32.

Referring back to FIG. 3, the description will be continued. Next, the deformation unit 32 will be described. The deformation unit 32 deforms the reference projection screen 40 into the projection shape 41 indicated by the projection shape information received from the determination unit 30. By the deformation processing, the deformation unit 32 generates a deformed projection screen 42 being the deformed reference projection screen 40 (refer to FIG. 5B).

In other words, the deformation unit 32 deforms the reference projection screen 40 by using position information of the detection points P and self-location information of the moving object 2 that have been accumulated in the environmental map information 26A.

More specifically, for example, the deformation unit 32 deforms the reference projection screen 40 into a curved surface shape passing through the detection point P closest to the moving object 2, on the basis of projection shape information. By the deformation processing, the deformation unit 32 generates the deformed projection screen 42.

Moreover, for example, the deformation unit 32 deforms, on the basis of projection shape information, the reference projection screen 40 into a shape corresponding to the asymptotic curve Q of a predefined number of detection points P in order near from the moving object 2.

Note that the deformation unit 32 preferably deforms the reference projection screen 40 by using position information of the detection point P and self-location information of the self-location S that have been acquired before a first timing.

The first timing is a latest timing at which position information of the detection point P is detected by the detector 14, or an arbitrary timing earlier than the latest timing. For example, the detection point P acquired before the first timing includes position information of a specific object existing around the moving object 2, and the detection point P acquired at the first timing does not include the position information of the specific object existing around the moving object 2. The determination unit 30 may determine the projection shape 41 similarly to the above-described method, by using position information of the detection point P that has been acquired before the first timing, and is included in the environmental map information 26A. Then, the deformation unit 32 may generate the deformed projection screen 42 similarly to the above-described method, by using projection shape information of the projection shape 41.

In this case, for example, even in a case where position information of the detection point P that has been detected by the detector 14 at the first timing does not include position information of the detection point P that has been detected earlier than the timing, the deformation unit 32 can generate the deformed projection screen 42 in accordance with the detection point P detected at the earlier timing.

Next, the projection transformation unit 36 will be described. The projection transformation unit 36 generates the projected image 51 by projecting a captured image acquired from the image capturing unit 12 onto the deformed projection screen 42 being the reference projection screen 40 deformed by the deformation unit 32.

More specifically, the projection transformation unit 36 receives deformed projection screen information of the deformed projection screen 42 from the deformation unit 32. The deformed projection screen information is information indicating the deformed projection screen 42. The projection transformation unit 36 projects a captured image acquired from the image capturing unit 12 via the acquisition unit 20, onto the deformed projection screen 42 indicated by the received deformed projection screen information. By the projection processing, the projection transformation unit 36 generates the projected image 51.

Then, the projection transformation unit 36 transforms the projected image 51 into a virtual viewpoint image. The virtual viewpoint image is an image obtained by viewing the projected image 51 from a virtual viewpoint in an arbitrary direction.

The description will be given by referring to FIG. 5B. The projection transformation unit 36 projects a captured image 50 onto the deformed projection screen 42. Then, the projection transformation unit 36 generates a virtual viewpoint image (not illustrated) being an image obtained by viewing the captured image 50 projected onto the deformed projection screen 42, from an arbitrary virtual viewpoint O in an eye direction L. The position of the virtual viewpoint O may be set to the latest self-location S of the moving object 2, for example. In this case, it is sufficient that the values of XY coordinates of the virtual viewpoint O are set to values of XY coordinates of the latest self-location S of the moving object 2. In addition, it is sufficient that a value of a Z coordinate (position in the vertical direction) of the virtual viewpoint O is set to a value of a Z coordinate of the detection point P closest to the self-location S of the moving object 2. The eye direction L may be determined on the basis of a predefined standard, for example.

The eye direction L may be set to a direction heading for the detection point P closest to the self-location S of the moving object 2 from the virtual viewpoint O, for example. In addition, the eye direction L may be set to a direction passing through the detection point P and being vertical to the deformed projection screen 42. Virtual viewpoint and visual line information indicating the virtual viewpoint O and the eye direction L is created by the virtual viewpoint and visual line determination unit 34.

Referring back to FIG. 3, the description will be continued. The virtual viewpoint and visual line determination unit 34 determines virtual viewpoint and visual line information.

For example, the virtual viewpoint and visual line determination unit 34 may determine, as the eye direction L, a direction passing through the detection point P closest to the self-location S of the moving object 2, and being vertical to the deformed projection screen 42. In addition, the virtual viewpoint and visual line determination unit 34 may fix the direction of the eye direction L, and determine the coordinates of the virtual viewpoint O as an arbitrary Z coordinate and arbitrary XY coordinates in a direction getting away from the asymptotic curve Q toward the self-location S. In this case, the XY coordinates may be coordinates of a position more distant from the asymptotic curve Q than the self-location S. Then, the virtual viewpoint and visual line determination unit 34 outputs virtual viewpoint and visual line information indicating the virtual viewpoint O and the eye direction L, to the projection transformation unit 36. Note that, as illustrated in FIG. 6, the eye direction L may be set to a direction heading for the position of a vertex W of the asymptotic curve Q from the virtual viewpoint O.

Referring back to FIG. 3, the description will be continued. The projection transformation unit 36 receives the virtual viewpoint and visual line information from the virtual viewpoint and visual line determination unit 34. The projection transformation unit 36 identifies the virtual viewpoint O and the eye direction L by receiving the virtual viewpoint and visual line information. Then, the projection transformation unit 36 generates a virtual viewpoint image being an image viewed from the virtual viewpoint O in the eye direction L, from the captured image 50 projected onto the deformed projection screen 42. The projection transformation unit 36 outputs the virtual viewpoint image to the image synthesis unit 38.

The image synthesis unit 38 generates a synthetic image obtained by extracting part of or all the virtual viewpoint image. For example, the image synthesis unit 38 determines a width of an overlap portion of captured images 50 included in the virtual viewpoint image, and performs combining processing of the captured images 50 and blend processing of determining a captured image 50 to be displayed in an overlap portion. A synthetic image 54 is thereby generated. Then, the image synthesis unit 38 outputs the synthetic image 54 to the display unit 16. Note that the synthetic image 54 may be a bird's-eye view image in which the virtual viewpoint O is set to an upper side of the moving object 2, or may be an image in which the virtual viewpoint O is set to the inside of the moving object 2 and the moving object 2 is translucently displayed.

Next, an example of a flow of image processing executed by the image processing apparatus 10 will be described.

Figure 8:
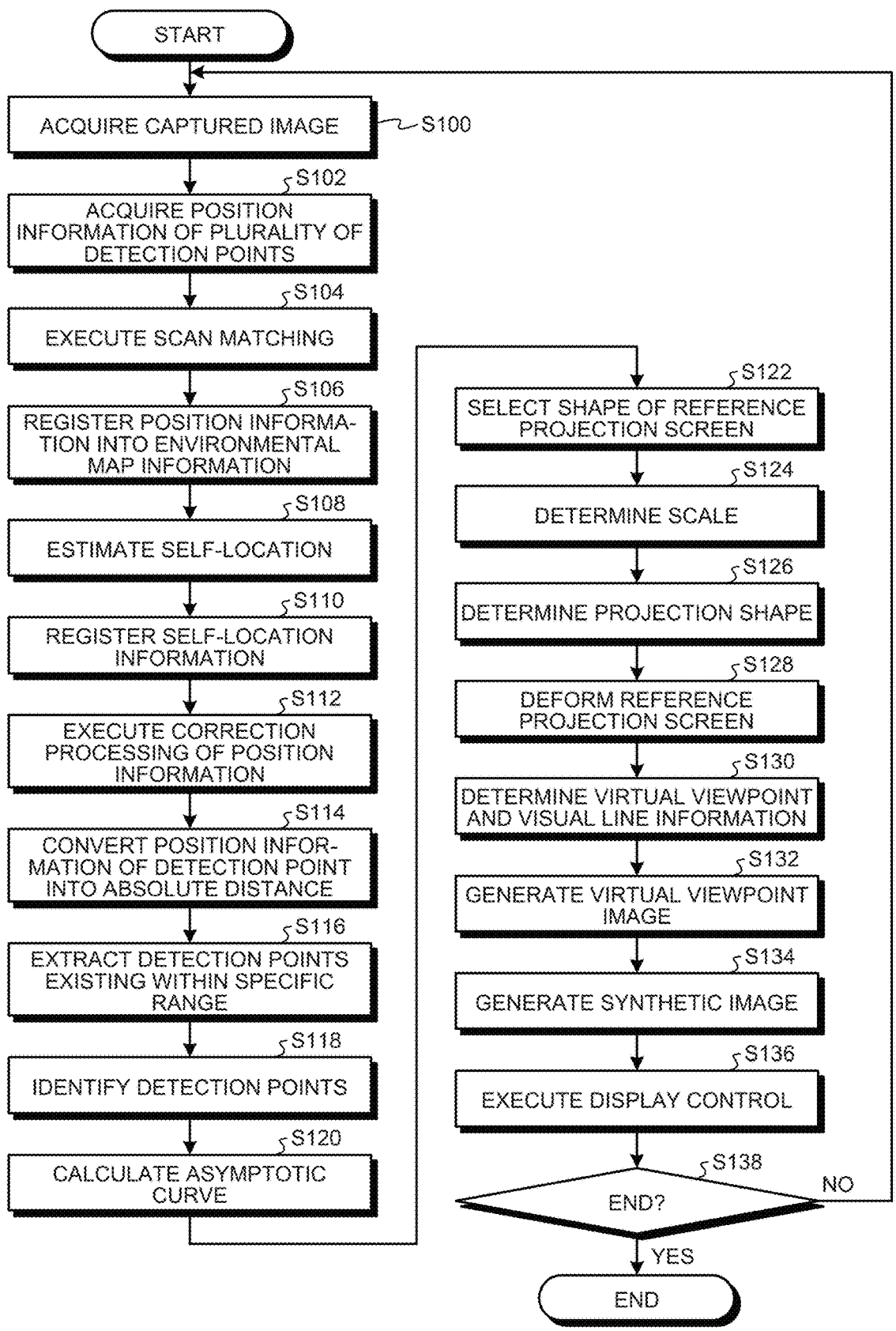
FIG. 8 is a flowchart illustrating a flow of image processing according to the first embodiment.

FIG. 8 is a flowchart illustrating an example of a flow of image processing executed by the image processing apparatus 10.

The acquisition unit 20 acquires the captured image 50 from the image capturing unit 12 (Step S100). In addition, the acquisition unit 20 acquires position information of each of the detection points P from the detector 14 (Step S102).

The detection point registration unit 22 identifies, by scan matching, the same detection point P registered in the environmental map information 26A as each of the detection points P of position information acquired in Step S102 (Step S104). Then, the detection point registration unit 22 registers, into the environmental map information 26A, position information of the detection point P unregistered in the environmental map information 26A out of the pieces of position information of the detection points P acquired in Step S102 (Step S106).

The localization unit 24 estimates self-location information indicating the self-location S of the moving object 2 on the basis of position information of each of the detection points P registered in the environmental map information 26A and the position information acquired in Step S102 (Step S108). Then, the localization unit 24 registers the estimated self-location information into the environmental map information 26A (Step S110).

The correction unit 28 corrects position information of the detection point P registered in the environmental map information 26A, by using position information of the detection point P acquired in Step S102 (Step S112). Note that, as described above, a configuration of not executing the correction processing in Step S112 may be employed.

The absolute distance conversion unit 30A of the determination unit 30 converts position information of each of the detection points P included in the environmental map information 26A, into distance information indicating an absolute distance to each of the detection points P from the current position of the moving object 2 (Step S114).

The extraction unit 30B extracts the detection points P existing within a specific range, from among the detection points P of which distance information indicating absolute distances has been calculated by the absolute distance conversion unit 30A (Step S116).

The closest point identification unit 30C identifies detection points P in order near from the moving object 2 for each angle range around the moving object 2, by using distance information of each of the detection points P extracted in Step S116 (Step S118).

The asymptotic curve calculation unit 30F calculates the asymptotic curve Q by using each piece of distance information of the detection points P identified in Step S118 for each angle range (Step S120).

The reference projection screen shape selection unit 30D selects the shape of the reference projection screen 40 (Step S122). As described above, a configuration in which the reference projection screen shape selection unit 30D selects the reference projection screen 40 with a bowl shape will be described as an example.

The scale determination unit 30E determines a scale of the reference projection screen 40 with the shape selected in Step S122 (Step S124).

The shape determination unit 30G expands or reduces the reference projection screen 40 with the shape selected in Step S122, into the scale determined in Step S124. Then, the shape determination unit 30G deforms the expanded or reduced reference projection screen 40 into a shape corresponding to the asymptotic curve Q calculated in Step S120. The shape determination unit 30G determines the deformed shape as the projection shape 41 (Step S126).

The deformation unit 32 deforms the reference projection screen 40 into the projection shape 41 determined by the determination unit 30 (Step S128). By the deformation processing, the deformation unit 32 generates a deformed projection screen 42 being the deformed reference projection screen 40 (refer to FIG. 5B).

The virtual viewpoint and visual line determination unit 34 determines virtual viewpoint and visual line information (Step S130). For example, the virtual viewpoint and visual line determination unit 34 determines the self-location S of the moving object 2 as the virtual viewpoint O, and a direction heading for the position of the vertex W of the asymptotic curve Q from the virtual viewpoint O, as the eye direction L. More specifically, the virtual viewpoint and visual line determination unit 34 may determine, as the eye direction L, a direction heading for the vertex W of the asymptotic curve Q in a specific one angle range, out of the asymptotic curves Q calculated for the respective angle ranges in Step S120.

The projection transformation unit 36 projects the captured image 50 acquired in Step S100 onto the deformed projection screen 42 generated in Step S128. Then, the projection transformation unit 36 transforms the projected image 51 into a virtual viewpoint image being an image obtained by viewing the captured image 50 projected onto the deformed projection screen 42, in the eye direction L from the virtual viewpoint O determined in Step S130 (Step S132).

The image synthesis unit 38 generates the synthetic image 54 by extracting part of or all the virtual viewpoint image generated in Step S132 (Step S134). For example, the image synthesis unit 38 determines a width of an overlap portion of captured images 50 included in the virtual viewpoint image, and performs combining processing of the captured images 50 and blend processing of determining a captured image 50 to be displayed in an overlap portion. Then, the image synthesis unit 38 executes display control of outputting the generated synthetic image 54 to the display unit 16 (Step S136).

Next, the image processing apparatus 10 determines whether or not to end the image processing (Step S138). The image processing apparatus 10 may perform the determination in Step S138 by determining whether or not a signal indicating a position movement stop of the moving object 2 has been received from the ECU 3. In addition, for example, the image processing apparatus 10 may perform the determination in Step S138 by determining whether or not an end instruction of image processing has been received by an operation instruction issued by the user.

When negative determination is made in Step S138 (Step S138: No), the processing returns to Step S100 described above. When positive determination is made in Step S138 (Step S138: Yes), this routine is ended. Note that, in a case where the processing returns to Step S100 from Step S138 after the correction processing in Step S112 is executed, the correction processing in subsequent Step S112 may be omitted in some cases. In addition, in a case where the processing returns to Step S100 from Step S138 without executing the correction processing in Step S112, the correction processing in subsequent Step S112 may be executed in some cases.

Next, a specific example of image processing executed by the image processing apparatus 10 of the present embodiment will be described by using a timing chart.

FIG. 9A is a diagram illustrating an example of captured images 50 captured at the respective timings of statuses T1 to T4. Each of the captured images 50 in FIG. 9A is captured by, for example, the image capturing unit 12D of the moving object 2. The statuses T1 to T4 are assumed to be statuses in which the moving object 2 is parked into a parking space near a pole C. Note that a larger numerical value following "T" means a later timing. In other words, the statuses T1 to T4 indicate the passage of time in this order. Captured images 50T1 to 50T4 are examples of the captured images 50 captured at the respective timings of the statuses T1 to T4.

At the timing of the status T1, the pole C existing in the real space is undetected by the detector 14. In other words, at the timing of the status T1, the pole C exists outside the detection region F of the detector 14. In addition, at the timings of the statuses T2 and T3, the pole C existing in the real space exists within the detection region F of the detector 14. At the timing of the status T4, the pole C existing in the real space exists outside the detection region F of the detector 14.

Figure 9B:
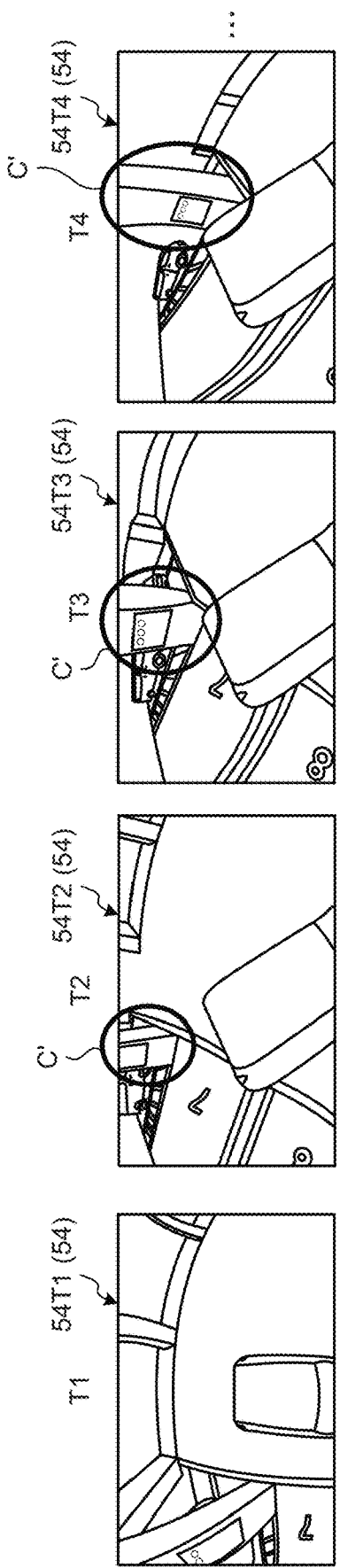
FIG. 9B is a schematic diagram illustrating a synthetic image according to the first embodiment.

FIG. 9B is a schematic diagram illustrating an example of the synthetic images 54 output by the image processing apparatus 10 at the respective timings of the statuses T1 to T4. Synthetic images 54T1 to 54T4 are examples of the synthetic images 54 corresponding to the respective timings of the statuses T1 to T4.

FIG. 9C is a schematic diagram illustrating an example of a timing chart of image processing executed by the image processing apparatus 10.

In FIG. 9C, "DR" represents reading processing of the environmental map information 26A. "SM" represents scan matching executed by the detection point registration unit 22. "MW" represents registration processing of position information into the environmental map information 26A that is executed by the detection point registration unit 22. "PO" represents estimation processing of self-location information of the moving object 2 that is executed by the localization unit 24. "PW" represents registration of self-location information into the environmental map information 26A that is executed by the localization unit 24. "DW" represents update processing of position information in the environmental map information 26A that is executed by the correction unit 28.

In addition, in FIG. 9C, "detection point registration processing" is registration processing of position information of the detection point P into the environmental map information 26A that is executed by the detection point registration unit 22. "Localization processing" is estimation processing of self-location information of the moving object 2 and registration processing of self-location information into the environmental map information 26A that are executed by the localization unit 24. "Correction processing" is correction processing of position information that is executed by the correction unit 28. "Display control processing" is processing including acquisition of the captured image 50 that is executed by the acquisition unit 20, determination of the projection shape 41 (projection shape determination) that is executed by the determination unit 30, deformation of the reference projection screen 40 (projection shape transformation) that is executed by the deformation unit 32, generation of a virtual viewpoint image (projection transformation) that is executed by the projection transformation unit 36, generation of the synthetic image 54 (synthetic image generation) that is executed by the image synthesis unit 38, and display control of the synthetic image 54 that is executed by the image synthesis unit 38.

Note that a status T5 illustrated in FIG. 9C is a status at a timing following the status T4, and is supposed to be a status in which the pole C existing in the real space exists outside the detection region of the detector 14.

As illustrated in FIG. 9C, at each of the timings of the statuses T1 to T5, processing using the captured image 50 (the captured images 50T1 to 50T4) and position information of the detection point P in the corresponding status is executed. Thus, position information of each of the detection points P detected at each individual timing is sequentially and additionally registered into the environmental map information 26A. In addition, estimated self-location information is sequentially registered into the environmental map information 26A.

Then, at each of the timings of the statuses T1 to T5, the image processing apparatus 10 executes the above-described display control processing by using position information of the detection point P and self-location information of the self-location S that are registered in the environmental map information 26A.

In other words, position information of the detection point P that has been once detected is sequentially accumulated into the environmental map information 26A. Then, the image processing apparatus 10 executes the above-described display control processing by deforming the reference projection screen 40 by using the environmental map information 26A.

Thus, as illustrated in FIGS. 9A and 9B, in the case of the statuses T2 and T3 in which the pole C existing in the real space exists within the detection region F of the detector 14, the image processing apparatus 10 outputs the synthetic images 54T2 and 54T3. The synthetic images 54T2 and 54T3 include an image C' in which the pole C is reflected. Furthermore, even in a case where the status shifts to the status T4 in which the pole C existing in the real space exists outside the detection region F of the detector 14, the image processing apparatus 10 can output the synthetic image 54T4 in which the shape of the projection screen is deformed on the basis of position information of the pole C. This is because the image processing apparatus 10 of the present embodiment generates the synthetic image 54 on the basis of the deformed projection screen 42 deformed by using position information obtained by accumulating the detection points P around the moving object 2.

As described above, the deformation unit 32 of the image processing apparatus 10 of the present embodiment deforms the reference projection screen 40 with a predefined shape, which is a projection screen of a surrounding image of the moving object 2, by using position information in which detection points P around the moving object 2 are accumulated and also using self-location information of the moving object 2.

Due to the movement of the moving object 2, part of an object around the moving object 2 is sometimes positioned outside the detection region F of the detection point P. Even in such a case, the image processing apparatus 10 of the present embodiment deforms the reference projection screen 40 by using position information obtained by accumulating the detection points P around the moving object 2. Therefore, the image processing apparatus 10 is capable of deforming the reference projection screen 40 in accordance with the object around the moving object 2.

On the other hand, in the prior art, it has been difficult to deform a projection screen (the reference projection screen 40) in accordance with an object.

Figure 10A:
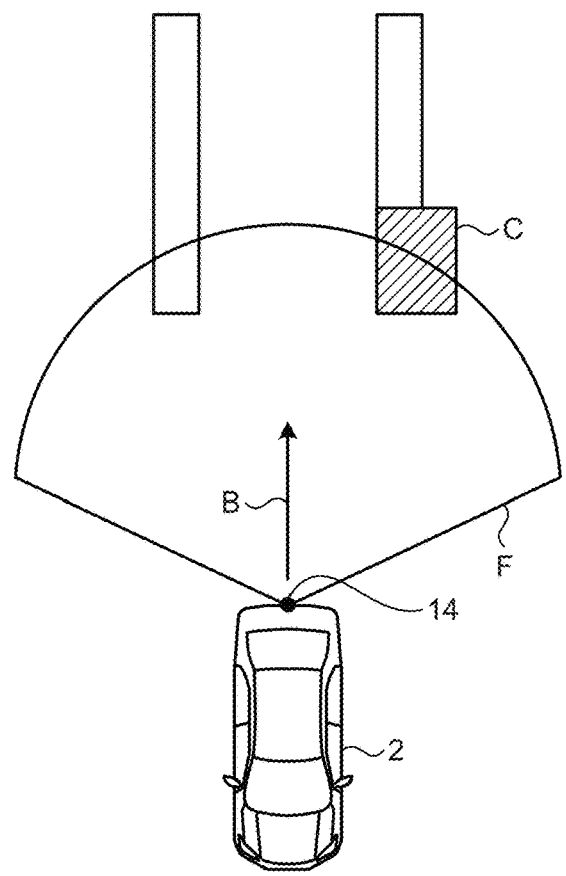
FIG. 10A is an explanatory diagram of conventional processing of projection screen deformation.
Figure 10B:
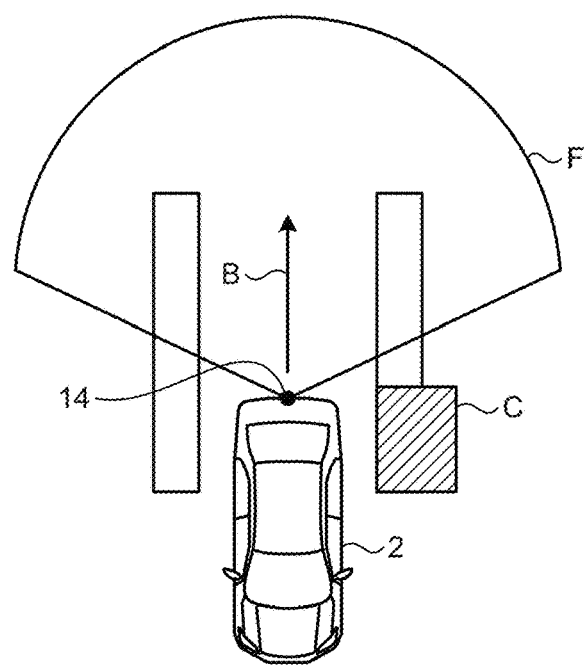
FIG. 10B is an explanatory diagram of conventional processing of projection screen deformation.

FIGS. 10A, 10B, 11A, and 11B are explanatory diagrams of an example of conventional deformation processing of a projection screen. FIGS. 10A and 10B are schematic diagrams of an example of a positional relationship between the detection region F of the detector 14 and a surrounding object when the moving object 2 travels in an arrow B direction. In FIGS. 10A and 10B, the pole C is depicted as an example of a surrounding object.

Figure 11A:
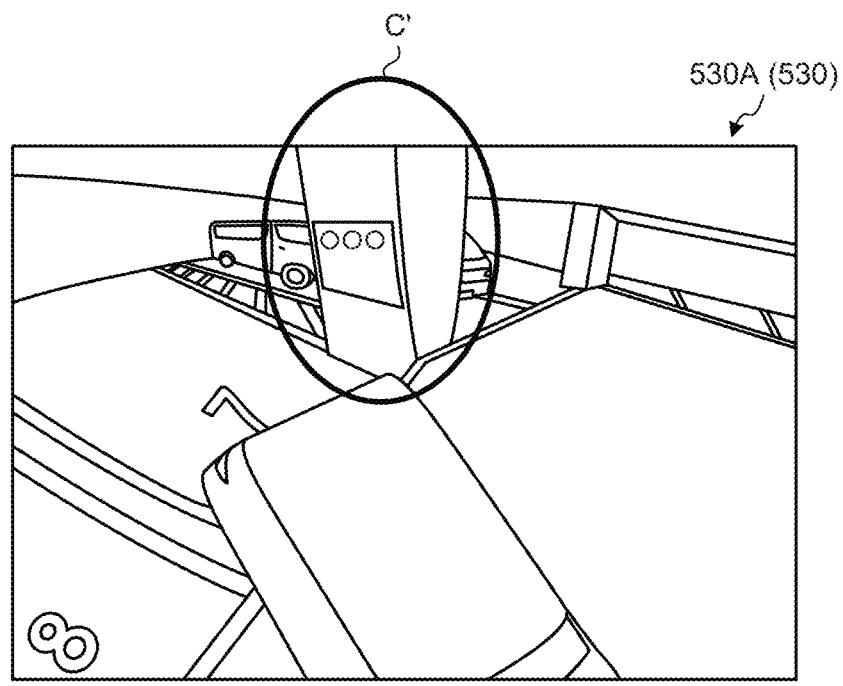
FIG. 11A is an explanatory diagram of conventional processing of projection screen deformation.

In the case of the positional relationship illustrated in FIG. 10A, the pole C exists within the detection region F of the detector 14. In this case, in the prior art, the reference projection screen 40 is deformed in accordance with a detection result of the detection region F, and thereby a synthetic image 530A as illustrated in FIG. 11A is output. The synthetic image 530A is an example of a conventional synthetic image 530. In the synthetic image 530A, the image C' in which the pole C is reflected is included.

Figure 11B:
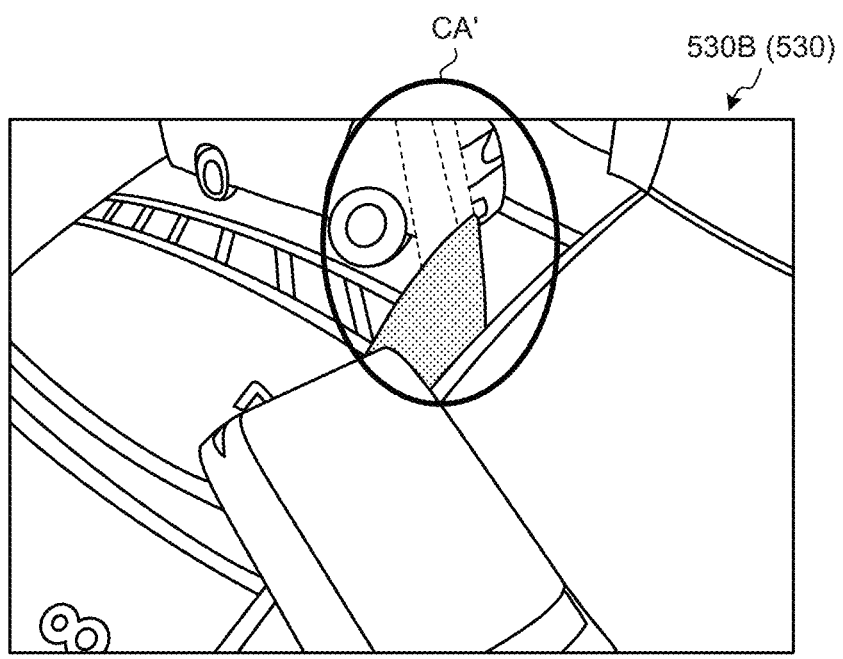
FIG. 11B is an explanatory diagram of conventional processing of projection screen deformation.

However, as illustrated in FIG. 10B, when the moving object 2 further moves forward in the arrow B direction, the pole C may fall outside the detection region F of the detector 14. In this case, the pole C is not located within the detection region F. Thus, in the prior art, it has been unable to deform the reference projection screen 40 in accordance with the pole C, so that a synthetic image 530B as illustrated in FIG. 11B is output, for example. The synthetic image 530B is an example of a conventional synthetic image 530. The synthetic image 530B does not include the image C' in which the pole C is reflected. In addition, the reference projection screen 40 is not deformed in accordance with the pole C, so that a region CA' in the synthetic image 530B corresponding to the pole C is distorted.

In this manner, in some cases in the prior art, it has been difficult to deform a projection screen (the reference projection screen 40) in accordance with a distance to an actual object.

On the other hand, the image processing apparatus 10 according to the present embodiment deforms the reference projection screen 40 by using position information obtained by accumulating the detection points P around the moving object 2, and self-location information of the moving object 2.

Figure 12A:
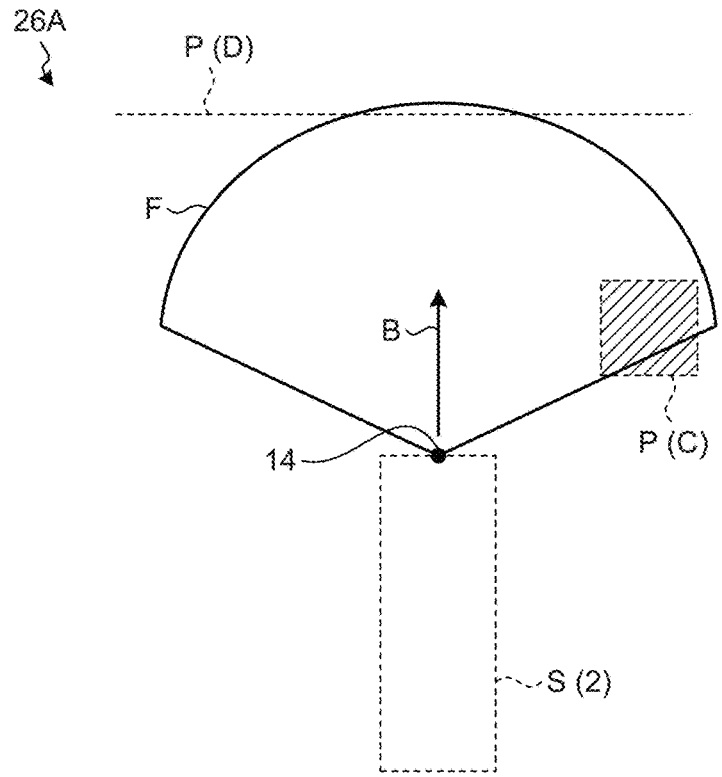
FIG. 12A is an explanatory diagram of deformation of a reference projection screen according to the first embodiment.
Figure 12B:
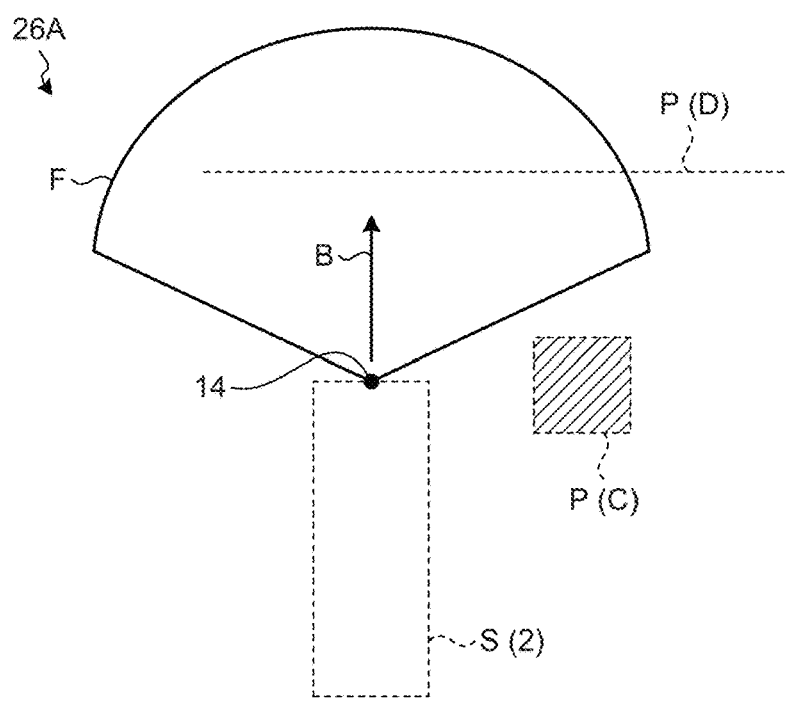
FIG. 12B is an explanatory diagram of deformation of a reference projection screen according to the first embodiment.

FIGS. 12A, 12B, 13A, and 13B are explanatory diagrams of deformation of the reference projection screen 40 that is executed by the image processing apparatus 10 of the present embodiment. FIGS. 12A and 12B are schematic diagrams each illustrating an example of the environmental map information 26A. FIG. 12A is a schematic diagram illustrating an example of the environmental map information 26A obtainable when a positional relationship is the positional relationship illustrated in FIG. 10A. FIG. 12B is a schematic diagram illustrating an example of the environmental map information 26A obtainable when a positional relationship is the positional relationship illustrated in FIG. 10B.

In the case of the positional relationship illustrated in FIG. 10A, the pole C is located within the detection region F of the detector 14. In addition, position information of the newly-detected detection point P is additionally registered into the environmental map information 26A. Thus, when the positional relationship is the positional relationship illustrated in FIG. 10A, detection points P of the pole C are registered in the environmental map information 26A (refer to FIG. 12A).

Figure 13A:
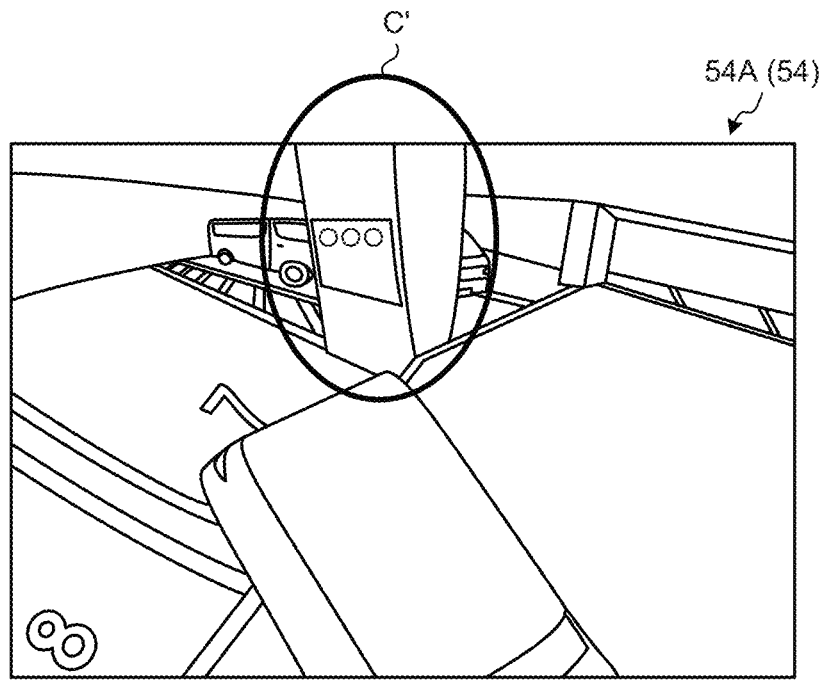
FIG. 13A is an explanatory diagram of deformation of a reference projection screen according to the first embodiment.

Then, the image processing apparatus 10 of the present embodiment deforms the reference projection screen 40 by using the environmental map information 26A in which position information of the detection points P is accumulated. Thus, when the positional relationship is the positional relationship illustrated in FIG. 10A, the image processing apparatus 10 of the present embodiment outputs a synthetic image 54A as illustrated in FIG. 13A. The synthetic image 54A is an example of the synthetic image 54 of the present embodiment. The synthetic image 54A includes the image C' in which the pole C is reflected.

In addition, a case where the pole C falls outside the detection region F due to the traveling of the moving object 2 in the arrow B direction is supposed (refer to FIG. 10B). Position information of the newly-detected detection point P is additionally registered into the environmental map information 26A with position information of the already-detected detection point P remaining registered. Thus, when the positional relationship is the positional relationship illustrated in FIG. 10B, the detection points P of the pole C positioned outside the detection region F are also registered in the environmental map information 26A (refer to FIG. 12B).

Then, the image processing apparatus 10 of the present embodiment deforms the reference projection screen 40 by using the environmental map information 26A in which position information of the detection points P is accumulated. In other words, even in a case where the pole C falls outside the detection region F, the image processing apparatus 10 can calculate a positional relationship (distance information) between the moving object 2 and the detection point P by using position information of the accumulated detection points P and self-location information of the estimated self-location S. In addition, even in a case where the pole C falls outside the detection region F, the image processing apparatus 10 can estimate self-location information of the moving object 2 by using a detection point P of a newly-detected different object (for example, a detection point P of a wall D or the like). Then, the image processing apparatus 10 can deform the reference projection screen 40 in such a manner as to appropriately display the pole C falling outside the detection region F, by using calculated distance information and self-location information.

Figure 13B:
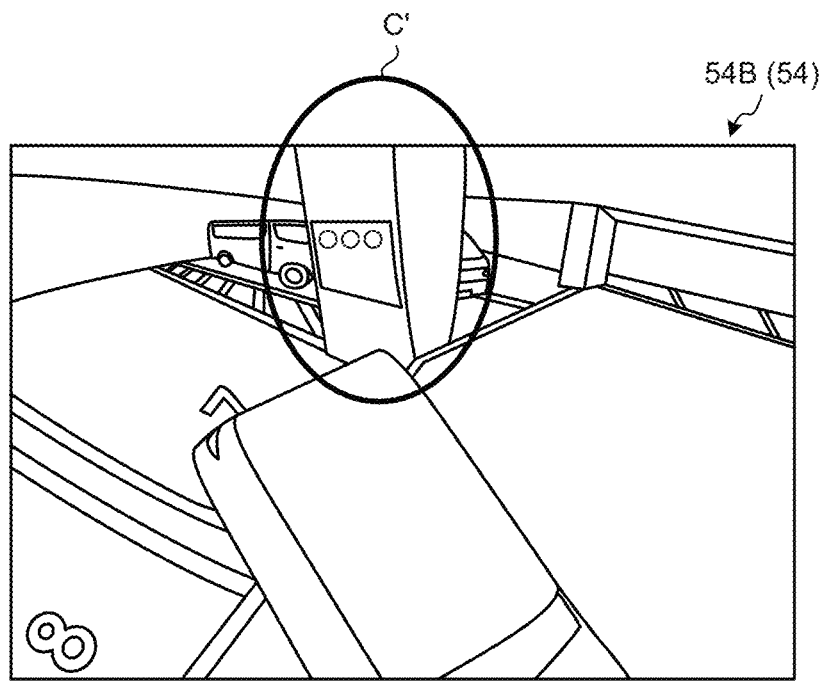
FIG. 13B is an explanatory diagram of deformation of a reference projection screen according to the first embodiment.

Thus, the image processing apparatus 10 of the present embodiment outputs a synthetic image 54B illustrated in FIG. 13B, for example, when the positional relationship is the positional relationship illustrated in FIG. 10B. The synthetic image 54B is an example of the synthetic image 54 of the present embodiment. The synthetic image 54B includes the image C' in which the pole C is reflected. In addition, because the reference projection screen 40 is deformed in accordance with the pole C, distortion included in a region in the synthetic image 54B that corresponds to the pole C is suppressed as compared with that in the prior art (refer to FIG. 11B).

Accordingly, the image processing apparatus 10 of the present embodiment is capable of deforming the reference projection screen 40 being a projection screen, in accordance with an object.

In addition, the image processing apparatus 10 of the present embodiment can deform the reference projection screen 40 in accordance with an object even in a case where the object exists outside the detection region F.

In addition, as described above, in the image processing apparatus 10 of the present embodiment, out of pieces of position information of detection points P acquired from the detector 14, the detection point registration unit 22 additionally registers position information of the detection point P that is unregistered in the environmental map information 26A, into the environmental map information 26A. In addition, the absolute distance conversion unit 30A of the determination unit 30 converts position information of each of the detection points P included in the environmental map information 26A, into distance information indicating an absolute distance from the current position of the moving object 2. By this processing, the absolute distance conversion unit 30A calculates distance information indicating an absolute distance of each of the detection points P.

Thus, it is possible to prevent distance information to the detection point P from the past self-location S, and distance information to the detection point P from the current self-location S from becoming inconsistent in accordance with the movement of the moving object 2. Thus, the image processing apparatus 10 of the present embodiment can deform the reference projection screen 40 in accordance with an object, by deforming the reference projection screen 40 by using distance information calculated by the absolute distance conversion unit 30A.

In addition, as described above, the determination unit 30 can determine, as the projection shape 41, a shape obtained by deforming the reference projection screen 40 into a curved surface shape passing through the detection point P closest to the moving object 2. In other words, the determination unit 30 protrudes a specific region in the reference projection screen 40 that includes a point obtained by projecting the detection point P in a direction extending along the XY plane, to a position passing through the detection point P. Then, the determination unit 30 can deform the shape of the reference projection screen 40 in such a manner that a distance from the self-location S continuously becomes farther from the protruded specific region toward a region on the sidewall surface 40B that is other than the specific region.

In a case where the projection shape 41 is set to a shape in which only the specific region is protruded from the sidewall surface 40B of the reference projection screen 40, a synthetic image 54 in which a boundary between the specific region and a region other than the specific region is unnaturally noncontiguous is sometimes generated. Thus, by the determination unit 30 determining, as the projection shape 41, a shape obtained by deforming the reference projection screen 40 into a curved surface shape passing through the detection point P, a natural synthetic image 54 can be provided.

In addition, as described above, the virtual viewpoint and visual line determination unit 34 of the image processing apparatus 10 of the present embodiment can determine the self-location S of the moving object 2 as the virtual viewpoint O, and determine, as the eye direction L, a direction passing through the detection point P closest to the self-location S of the moving object 2, and being vertical to the deformed projection screen 42. Then, the projection transformation unit 36 transforms the projected image 51 into a virtual viewpoint image being an image viewed from the virtual viewpoint O in the eye direction L.

Here, it is assumed that a downstream side end of the eye direction L is fixed to the detection point P closest to the self-location S of the moving object 2, and an angle of the eye direction L with respect to the deformed projection screen 42 is made variable. In this case, distortion may arise in a region in the synthetic image 54, which corresponds to the rising line 44 (refer to FIG. 5B) of the deformed projection screen 42.

Figure 14A:
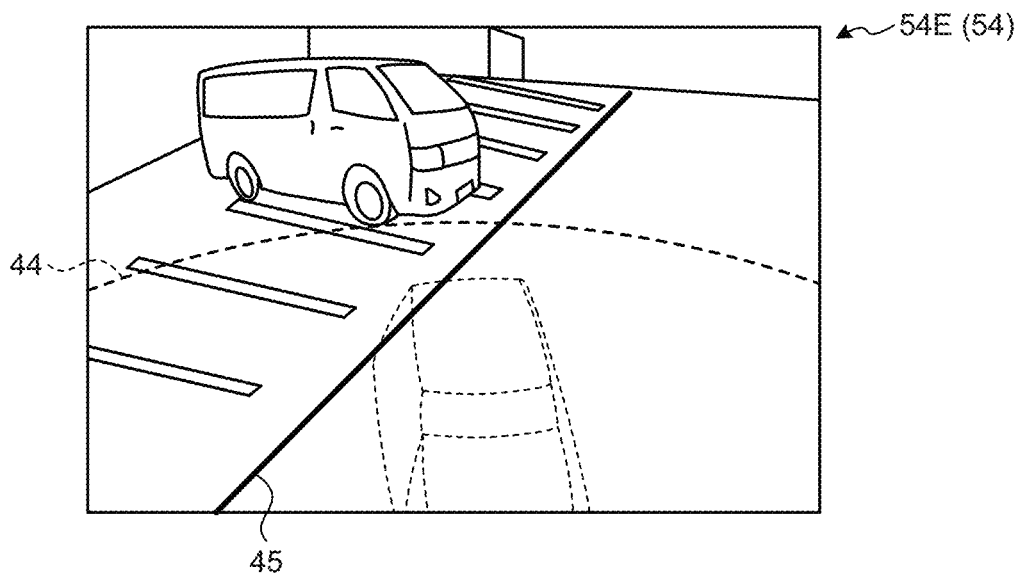
FIG. 14A is an explanatory diagram of determination of an eye direction L according to the first embodiment.
Figure 14B:
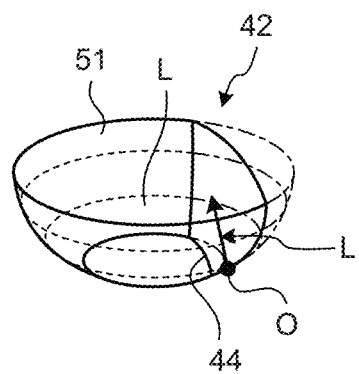
FIG. 14B is an explanatory diagram of determination of the eye direction L according to the first embodiment.
Figure 14C:
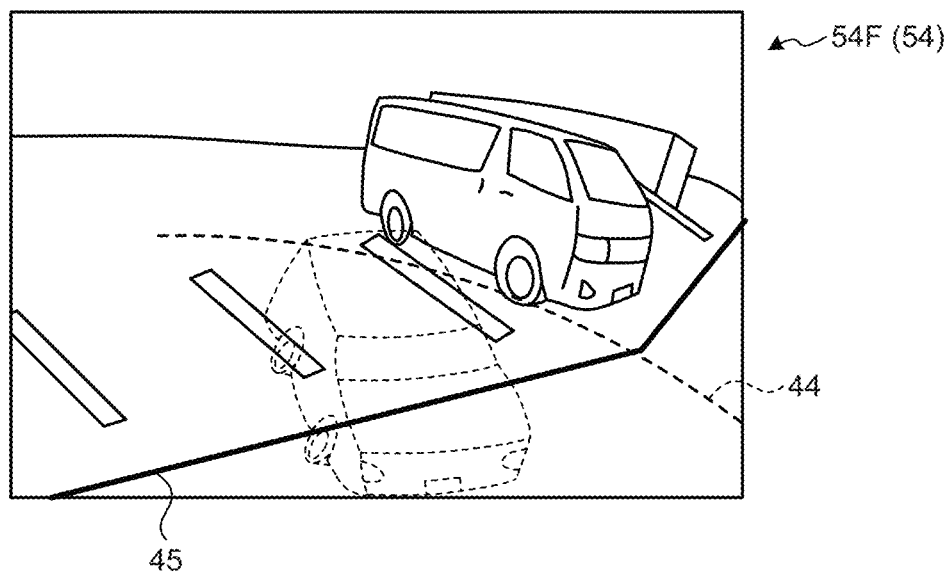
FIG. 14C is an explanatory diagram of determination of the eye direction L according to the first embodiment.

FIGS. 14A to 14C are explanatory diagrams of an example of determination of the eye direction L.

FIG. 14A is a schematic diagram illustrating an example of a synthetic image 54E output in a case where the eye direction L being a direction heading for the detection point P closest to the moving object 2 from the virtual viewpoint O is vertical to the deformed projection screen 42. The synthetic image 54E is an example of the synthetic image 54. The synthetic image 54E includes a line 45 reflecting a straight line existing in the real space. In this case, as illustrated in FIG. 14A, distortion is not included in a region in the synthetic image 54E that corresponds to the rising line 44 (refer to FIG. 5B as well) of the deformed projection screen 42. Thus, the line 45 in the synthetic image 54E reflecting the straight line existing in the real space becomes a linear line similarly to the straight line existing in the real space.

FIG. 14B is a schematic diagram illustrating an example of a relationship between the eye direction L and the deformed projection screen 42 that is obtainable in a case where an angle of the eye direction L with respect to the deformed projection screen 42 becomes an angle smaller than 90° (for example, equal to or smaller than 45°) due to the movement of the moving object 2. FIG. 14C is a schematic diagram illustrating an example of a synthetic image 54F output in a case where the virtual viewpoint O and the eye direction L are brought into the positional relationship illustrated in FIG. 14B. The synthetic image 54F is an example of the synthetic image 54. In this case, a line 45 in the synthetic image 54F reflecting the straight line existing in the real space becomes a line distorted from a region corresponding to the rising line 44 on the deformed projection screen 42.

In consideration of the above, the virtual viewpoint and visual line determination unit 34 of the present embodiment preferably determines the self-location S of the moving object 2 as the virtual viewpoint O, and determines, as the eye direction L, a direction passing through the detection point P closest to the self-location S of the moving object 2, and being vertical to the deformed projection screen 42. Then, the projection transformation unit 36 preferably transforms the projected image 51 into a virtual viewpoint image being an image viewed from the virtual viewpoint O in the eye direction L.

In this case, even in a case where the moving object 2 moves, the eye direction L is maintained in a direction vertical to the deformed projection screen 42 (refer to FIG. 5B). Thus, as illustrated in FIG. 14A, the synthetic image 54E becomes an image not including a distortion in a region corresponding to the rising line 44 of the deformed projection screen 42. Thus, the line 45 in the synthetic image 54E reflecting a straight line existing in the real space becomes a linear line similarly to the straight line existing in the real space.

Thus, the image processing apparatus 10 of the present embodiment can achieve accuracy improvement of the synthetic image 54 in addition to the above-described effect.

Here, in some cases, objects such as the pole C are included around the moving object 2 in directions different from each other. In the case of such a state, if a direction heading for one closest detection point P from the virtual viewpoint O is set as the eye direction L, the synthetic image 54 sometimes does not include at least one of these objects existing in the real space.

Figure 15A:
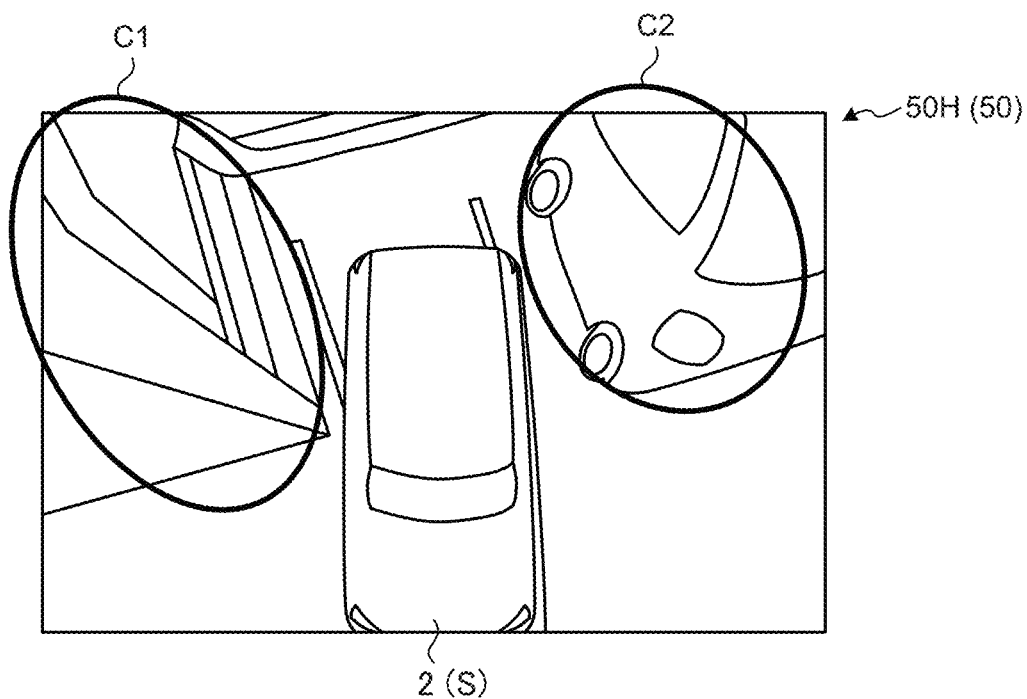
FIG. 15A is a schematic diagram illustrating a captured image according to the first embodiment.

FIG. 15A is a diagram illustrating an example of a captured image 50H. The captured image 50H is an example of the captured image 50. It is assumed that objects C1 and C2 are included in the captured image 50H.

Figure 15B:
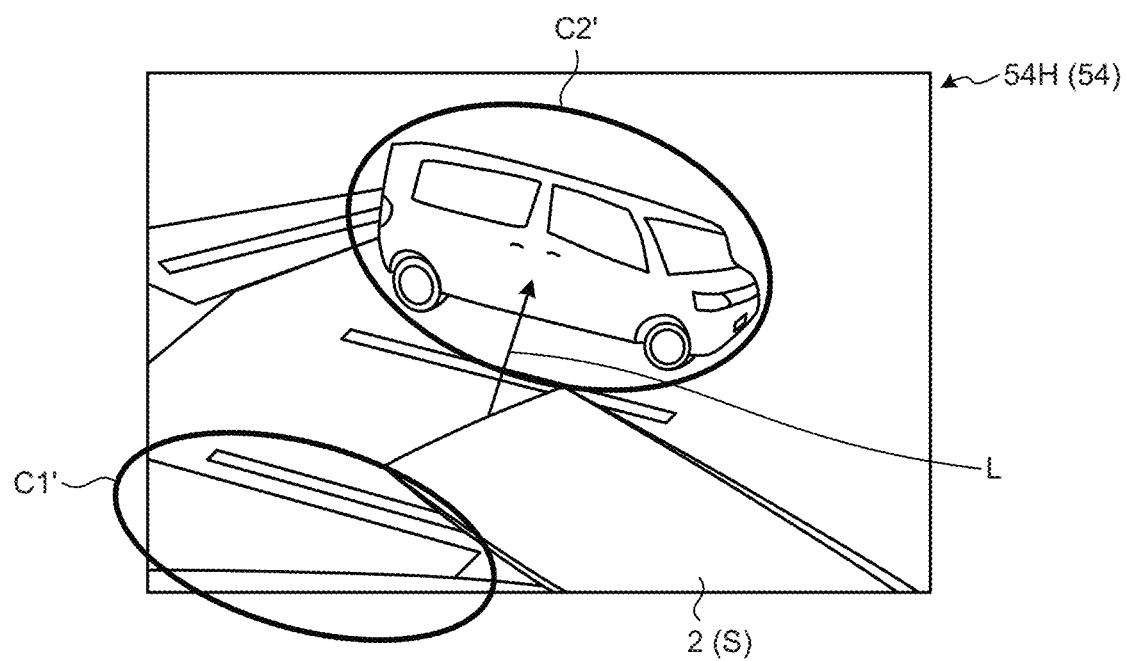
FIG. 15B is a schematic diagram illustrating a synthetic image according to the first embodiment.

In this case, when a direction heading for the detection point P existing at the position closest to the moving object 2 is set as the eye direction L, a synthetic image 54H as illustrated in FIG. 15B is output in some cases. FIG. 15B is a schematic diagram illustrating an example of the synthetic image 54H. The synthetic image 54H is an example of the synthetic image 54.

As illustrated in FIG. 15B, the synthetic image 54 includes an image C2' in which the object C2 is reflected, but does not include an image C1' in which the object C1 is reflected.

In consideration of the above, the determination unit 30 determines, as the projection shape 41, a shape deformed into a shape corresponding to the asymptotic curve Q of a predefined number of detection points P in order near from the self-location S of the moving object 2. Then, the virtual viewpoint and visual line determination unit 34 can determine the self-location S of the moving object 2 as the virtual viewpoint O, and also determine a direction heading for the position of the vertex W of the asymptotic curve Q from the virtual viewpoint O, as the eye direction L.

By setting the eye direction L to a direction heading for the position of the vertex W, as illustrated in FIG. 6, the projected image 51 and the synthetic image 54 become images including the image C1' and the image C2' in which objects are reflected. Thus, the image processing apparatus 10 of the present embodiment can further achieve accuracy improvement of the synthetic image 54 in addition to the above-described effect.

In addition, as described above, in the present embodiment, as a result of scan matching executed by the detection point registration unit 22, in a case where detection points P already-registered in the environmental map information 26A and newly-acquired detection points P do not coincide with each other at a predetermined percentage or more, position information of the newly-acquired detection points P can be discarded. Thus, the image processing apparatus 10 of the present embodiment can enhance the reliability of the environmental map information 26A in addition to the above-described effect. In addition, the image processing apparatus 10 can suppress a fluctuation of the deformed projection screen 42 in a time direction, and achieve stabilization of the synthetic image 54.

Second Embodiment

In the above-described first embodiment, a configuration in which the detector 14 detects position information of the detection point P has been described as an example. In the present second embodiment, a configuration in which position information of the detection point P is acquired from the captured image 50 captured by the image capturing unit 12 will be described.

Figure 16:
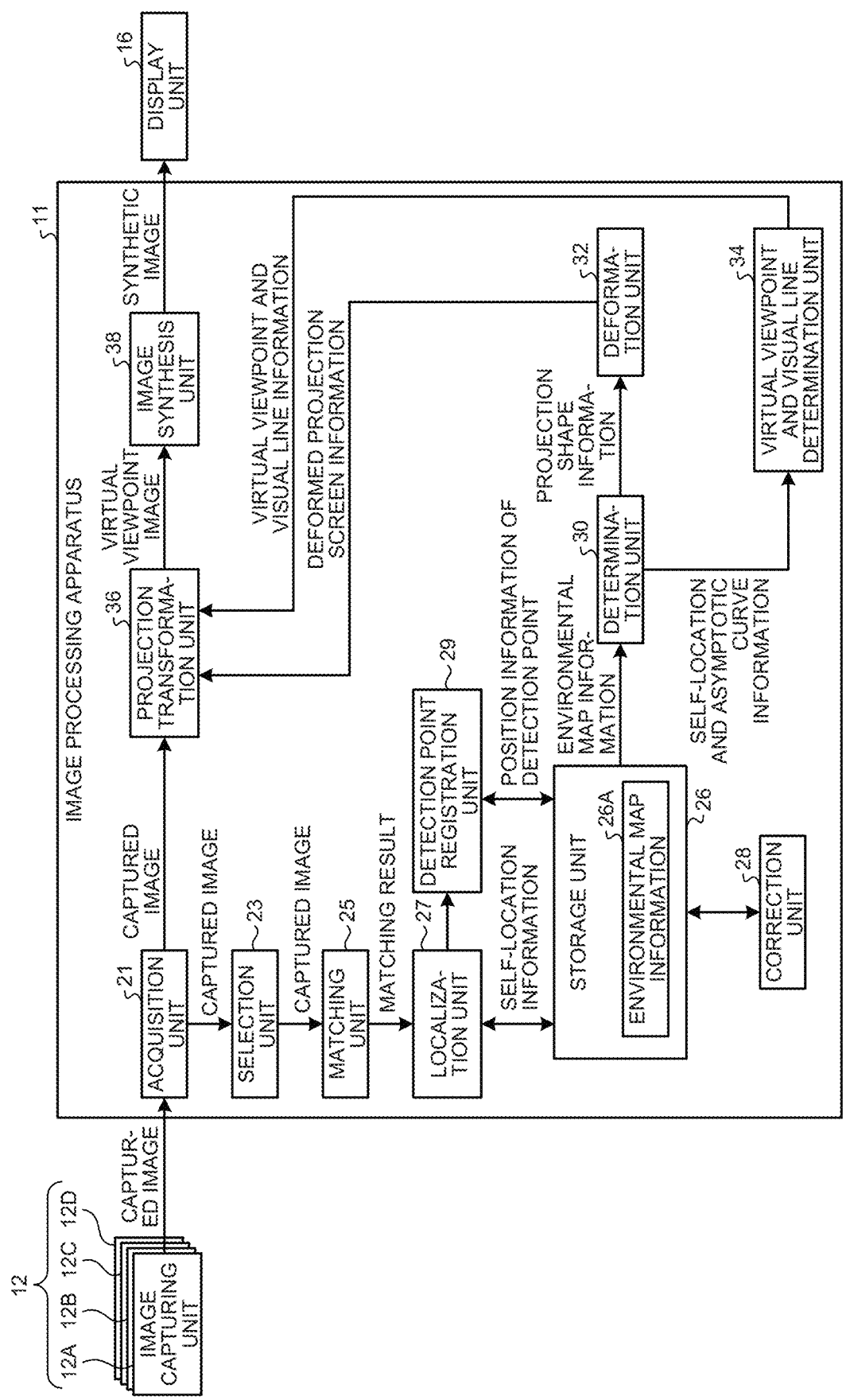
FIG. 16 is a diagram illustrating a functional configuration of an image processing apparatus according to a second embodiment.

FIG. 16 is a diagram illustrating an example of a functional configuration of an image processing apparatus 11 of the present embodiment. Similarly to the image processing apparatus 10 of the first embodiment, the image processing apparatus 11 is connected to an image capturing unit 12 and a display unit 16 in such a manner that data or signals can be communicated. The image capturing unit 12 and the display unit 16 are similar to those of the first embodiment. Note that, in the present embodiment, a case where the image capturing unit 12 is a monocular camera will be described.

For clarifying an input-output relationship of data, FIG. 16 also illustrates the image capturing unit 12 and the display unit 16 in addition to the image processing apparatus 11.

The image processing apparatus 11 includes an acquisition unit 21, a selection unit 23, a matching unit 25, a localization unit 27, a detection point registration unit 29, a storage unit 26, a correction unit 28, a determination unit 30, a deformation unit 32, a virtual viewpoint and visual line determination unit 34, a projection transformation unit 36, and an image synthesis unit 38.

Part of or all the above-described units may be implemented by causing a processing device such as the CPU 10A to execute programs, for example. That is, part of or all the above-described units may be implemented by software. In addition, part of or all the above-described units may be implemented by hardware such as an IC, or may be implemented by the combination of software and hardware.

The storage unit 26, the correction unit 28, the determination unit 30, the deformation unit 32, the virtual viewpoint and visual line determination unit 34, the projection transformation unit 36, and the image synthesis unit 38 are similar to those of the first embodiment. The storage unit 26 stores environmental map information 26A. The environmental map information 26A is similar to that of the first embodiment.

The acquisition unit 21 acquires a captured image 50 from the image capturing unit 12. The acquisition unit 21 acquires the captured image 50 from each of the image capturing units 12 (image capturing units 12A to 12D).

Each time when the acquisition unit 21 acquires the captured image 50, the acquisition unit 21 outputs the acquired captured image 50 to the projection transformation unit 36 and the selection unit 23.

The selection unit 23 selects a detection region of the detection point P. In the present embodiment, the selection unit 23 selects a detection region by selecting any image capturing unit 12 from among the image capturing units 12 (image capturing units 12A to 12D).

In the present embodiment, the selection unit 23 selects any one image capturing unit 12 by using vehicle state information included in CAN data received from an ECU 3, detected direction information, or instruction information input by an operation instruction issued by the user.

The vehicle state information is information indicating a traveling direction of the moving object 2, a state of a direction instruction of the moving object 2, a state of a gear of the moving object 2, and the like, for example. The vehicle state information can be derived from CAN data. The detected direction information is information indicating a direction in which targeted information is detected, and can be derived by a Point of Interest (POI) technology. The instruction information is information indicating a direction to be targeted, and is input by an operation instruction issued by the user.

For example, the selection unit 23 selects a direction of a detection region by using vehicle state information. Specifically, using vehicle state information, the selection unit 23 identifies parking information such as reverse parking information indicating reverse parking of the moving object 2, or parallel parking information indicating parallel parking. The selection unit 23 stores in advance parking information and identification information of any one of the image capturing units 12 in association. For example, the selection unit 23 stores in advance identification information of the image capturing unit 12D (refer to FIG. 1) that captures an image of the rear side of the moving object 2, in association with reverse parking information. In addition, the selection unit 23 stores in advance identification information of each of the image capturing units 12B and 12C (refer to FIG. 1) that capture images of the horizontal direction of the moving object 2, in association with parallel parking information.

Then, the selection unit 23 selects a direction of a detection region by selecting an image capturing unit 12 corresponding to parking information derived from the received vehicle state information.

In addition, the selection unit 23 may select an image capturing unit 12 having an image capturing region E in a direction indicated by detected direction information. In addition, the selection unit 23 may select an image capturing unit 12 having an image capturing region E in a direction indicated by detected direction information derived by the POI technology.

The selection unit 23 outputs, to the matching unit 25, the captured image 50 captured by the selected image capturing unit 12 out of the captured images 50 acquired by the acquisition unit 21.

The matching unit 25 performs feature amount extraction processing and processing of matching between images, on captured images 50 whose capturing timings are different from each other. More specifically, the matching unit 25 performs feature amount extraction processing on the captured images 50. Then, for the captured images 50 with different image capturing timings, the matching unit 25 performs matching processing of identifying corresponding points in the captured images 50, by using feature amounts. Then, the matching unit 25 outputs the matching processing result to the localization unit 27. In addition, the matching unit 25 registers information regarding the identified corresponding points in the captured images 50, into the environmental map information 26A.

The localization unit 27 estimates self-location information of the moving object 2 by triangulation using information regarding points identified as corresponding points that is included in the matching processing result acquired from the matching unit 25. The self-location information includes, for example, information regarding positions of the moving object 2 and the orientations of the image capturing unit 12 that correspond to the respective different image capturing timings.

Then, the localization unit 27 registers the calculated self-location information into the environmental map information 26A.

The detection point registration unit 29 obtains a movement amount (translation amount and rotation amount) of the moving object 2 by using self-location information of the moving object 2 corresponding to each of different image capturing timings that has been estimated by the localization unit 27. Then, the detection point registration unit 29 obtains relative coordinates of corresponding points in the captured images 50 that have been identified by the matching unit 25, with respect to a self-location of the moving object 2, from the movement amount. Then, the detection point registration unit 29 registers the coordinates into the environmental map information 26A as coordinates of the detection points P. Note that the coordinates of the detection points P registered in the environmental map information 26A may be coordinates converted into coordinates having an origin set to a predetermined position.

In this manner, in the present embodiment, the image processing apparatus 11 simultaneously estimates position information of the detection point P and self-location information of the moving object 2 from the captured image 50 captured by the image capturing unit 12, by Visual Simultaneous Localization and Mapping (SLAM).

Note that the determination timing of the projection shape 41 that is performed by the determination unit 30 is not limited. For example, in the present embodiment, the determination unit 30 may determine the projection shape 41 by using the captured image 50 obtained at a timing at which a size of a subject included in a detection region selected by the selection unit 23 becomes larger due to the movement of the moving object 2.

Next, an example of a flow of image processing executed by the image processing apparatus 11 will be described.

Figure 17:
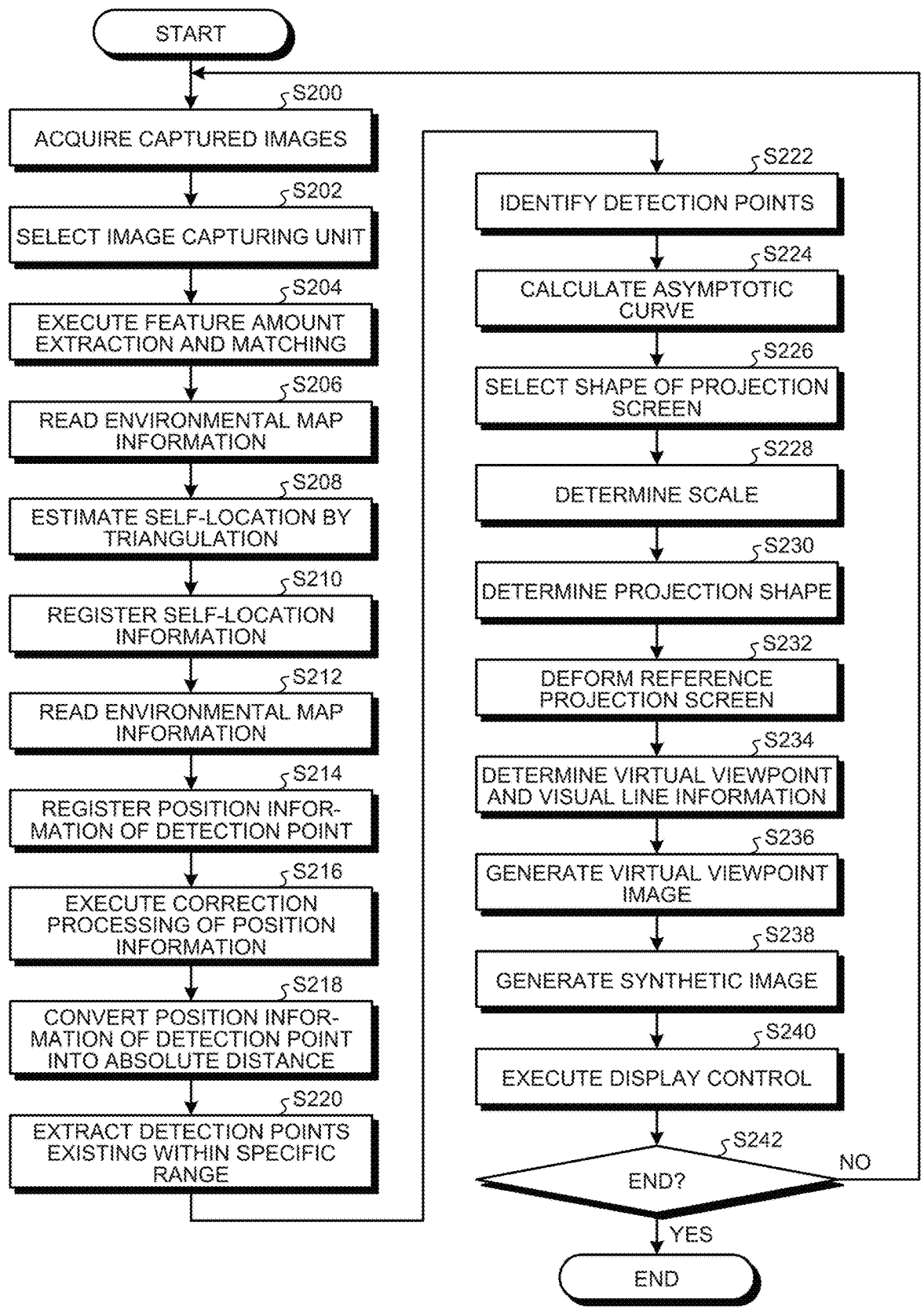
FIG. 17 is a flowchart illustrating a flow of image processing according to the second embodiment.

FIG. 17 is a flowchart illustrating an example of a flow of image processing executed by the image processing apparatus 11.

The acquisition unit 21 acquires the captured images 50 from the image capturing unit 12 (Step S200).

The selection unit 23 selects any image capturing unit 12 from among the image capturing units 12 (image capturing units 12A to 12D) (Step S202).

The matching unit 25 performs feature amount extraction and matching processing by using the captured images 50 captured at different timings by the image capturing unit 12 selected in Step S202, out of the captured images 50 acquired in Step S200 (Step S204). In addition, the matching unit 25 registers information regarding corresponding points in the captured images 50 with different image capturing timings that have been identified by matching processing, into the environmental map information 26A.

The localization unit 27 reads the environmental map information 26A (Step S206), and estimates self-location information of the moving object 2 corresponding to each of the different image capturing timings, by triangulation using the information regarding points identified as corresponding points that is registered in the environmental map information 26A (Step S208).

Then, the localization unit 27 registers the calculated self-location information into the environmental map information 26A (Step S210).

The detection point registration unit 29 reads the environmental map information 26A (Step S212), and obtains a movement amount (translation amount and rotation amount) of the moving object 2 by using self-location information of the moving object 2 corresponding to each of different image capturing timings. Then, the detection point registration unit 29 obtains, by using the obtained movement amount, relative coordinates of corresponding points in the captured images 50 with different image capturing timings, which have been identified by the matching processing in Step S204, with respect to the self-location of the moving object 2. Then, the detection point registration unit 29 registers the coordinates into the environmental map information 26A as coordinates of the detection points P (Step S214). Note that the coordinates of the detection points P registered in the environmental map information 26A may be coordinates converted into coordinates having an origin set to a predetermined position.

Then, the image processing apparatus 11 executes the processing in Steps S216 to S242 similarly to Steps S112 to S138 of the first embodiment, and ends this routine. Note that, in a case where the processing returns to Step S200 from Step S242 after the correction processing in Step S216 is executed, the correction processing in subsequent Step S216 may be omitted in some cases. In addition, in a case where the processing returns to Step S200 from Step S242 without executing the correction processing in Step S216, the correction processing in subsequent Step S216 may be executed in some cases.

Figure 18:
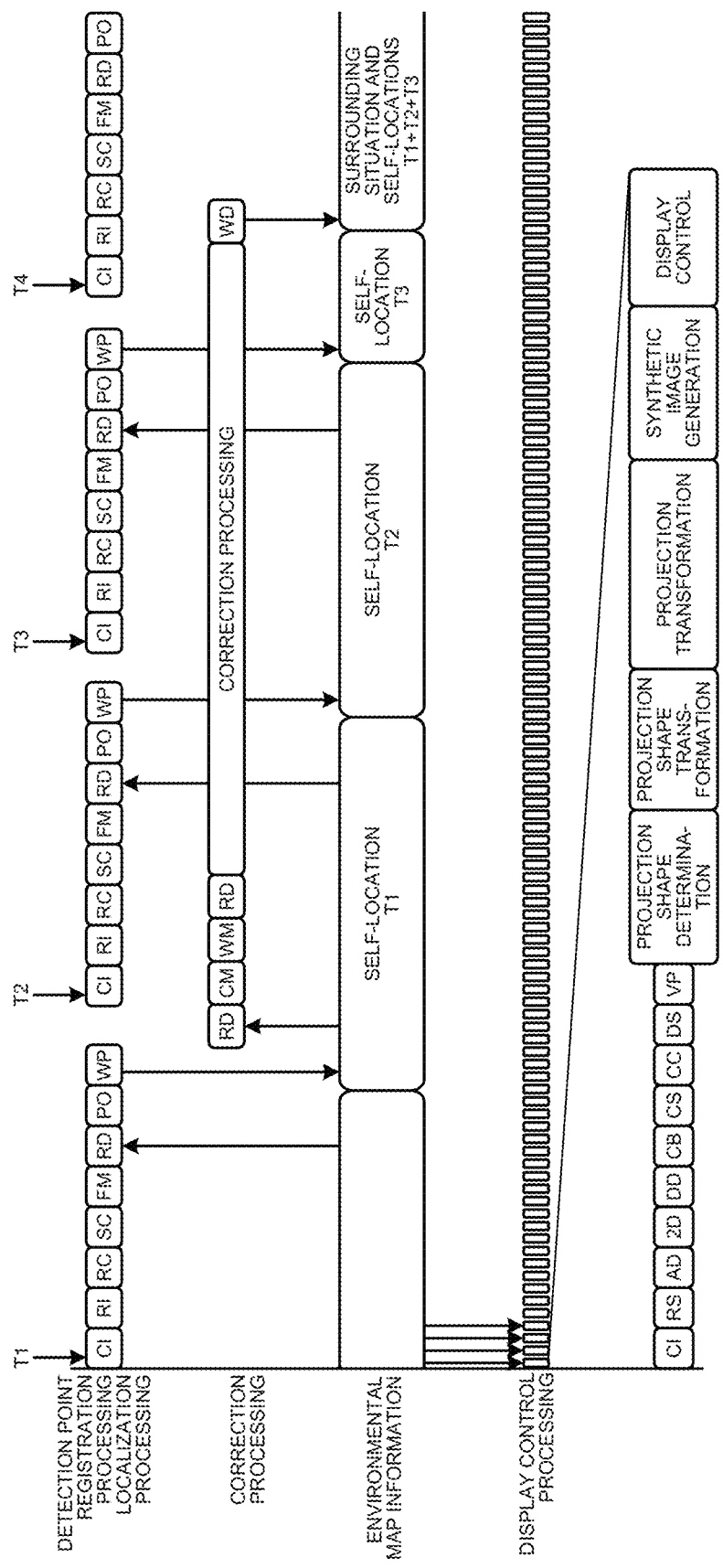
FIG. 18 is a schematic diagram illustrating a timing chart of image processing according to the second embodiment.

FIG. 18 is a schematic diagram illustrating an example of a timing chart of image processing executed by the image processing apparatus 11.

In FIG. 18, "CI" represents acquisition of captured images. "RI" represents acquisition of instruction information input by an operation instruction issued by the user. "RC" represents acquisition of CAN data that is executed by the acquisition unit 21. "SC" represents selection processing of the image capturing unit 12 that is executed by the selection unit 23. "FM" represents feature amount extraction processing and matching processing executed by the matching unit 25. "RD" represents reading processing of the environmental map information 26A. "PO" represents estimation processing of self-location information that is executed by the localization unit 27. "WP" represents registration of self-location information into the environmental map information 26A that is executed by the localization unit 27. "CM" represents creation processing of the environmental map information 26A. "WM" represents writing processing into the environmental map information 26A. "WD" represents writing processing of position information of the detection point P and self-location information into the environmental map information 26A.

In addition, in FIG. 18, "RS" represents reading processing of speed data of the moving object 2 included in CAN data that is executed by an absolute distance conversion unit 30A. "AD" represents calculation processing of distance information indicating an absolute distance of each of the detection points P that is executed by the absolute distance conversion unit 30A. "2D" represents extraction processing of the detection points P existing within a specific range that is executed by an extraction unit 30B. "DD" represents identification processing of identifying a detection point P closest to the moving object 2 or identifying detection points P in order near from the moving object 2, which is executed by a closest point identification unit 30C. Note that "DD" may mean processing of identifying a closest detection point P or identifying detection points P in order near from the moving object 2, for each angle range viewed from the self-location S of the moving object 2. "CB" represents selection processing of a shape of the reference projection screen 40 that is executed by a reference projection screen shape selection unit 30D. "CS" represents scale determination processing of the reference projection screen 40 that is executed by a scale determination unit 30E. "CC" represents calculation processing of the asymptotic curve Q that is executed by an asymptotic curve calculation unit 30F. "DS" represents determination processing of the projection shape 41 that is executed by a shape determination unit 30G. "VP" represents determination processing of virtual viewpoint and visual line information that is executed by a virtual viewpoint and visual line determination unit 34.

In addition, "Detection point registration processing" in FIG. 18 refers to registration processing of position information of the detection point P into the environmental map information 26A that is executed by the detection point registration unit 29. "Localization processing" is estimation processing of self-location information of the moving object 2 and registration processing of self-location information into the environmental map information 26A that are executed by the localization unit 27. "Correction processing" is correction processing of position information of the detection point P or self-location information of the moving object 2 that is executed by the correction unit 28. "Display control processing" is processing including acquisition of the captured image 50 that is executed by the acquisition unit 20, determination of the projection shape 41 (projection shape determination) that is executed by the determination unit 30, deformation of the reference projection screen 40 (projection shape transformation) that is executed by the deformation unit 32, generation of a virtual viewpoint image (projection transformation) that is executed by the projection transformation unit 36, generation of the synthetic image 54 (synthetic image generation) that is executed by the image synthesis unit 38, and display control of the synthetic image 54 that is executed by the image synthesis unit 38. In addition, statuses T1 to T4 illustrated in FIG. 18 are similar to those in the above-described first embodiment.

As illustrated in FIG. 18, at each of the timings of the statuses T1 to T4, processing using the captured image 50 in the corresponding status is executed. Thus, position information of each of the detection points P detected at each individual timing is sequentially and additionally registered into the environmental map information 26A. In addition, estimated self-location information is sequentially registered into the environmental map information 26A.

Then, at each of the timings of the statuses T1 to T4, the image processing apparatus 10 executes the above-described display control processing using position information of the detection point P and self-location information of the self-location S that are registered in the environmental map information 26A.

In other words, the image processing apparatus 11 of the present embodiment simultaneously estimates, by Visual SLAM, position information of the detection point P and self-location information of the moving object 2 from the captured image 50 captured by the image capturing unit 12, and then registers the position information and the self-location information into the environmental map information 26A.

Here, in the prior art, in some cases, it has been difficult to deform a projection screen (the reference projection screen 40) in accordance with a distance to an actual object.

Specifically, as described with reference to FIGS. 10B and 11B, in the prior art, because the reference projection screen 40 is not deformed in accordance with a pole C existing outside the detection region F, a region CA' in a conventional synthetic image 530B that corresponds to the pole C is distorted.

On the other hand, in the image processing apparatus 11 of the second embodiment, position information of the detection point P of the past object that has been image-captured by the image capturing unit 12 is also accumulated in the environmental map information 26A. Thus, even in a case where an object does not appear in the current image captured by the image capturing unit 12, the image processing apparatus 11 can provide a synthetic image 54 by deforming the shape of the projection screen on the basis of position information of the detection point P of the past object.

Figure 19:
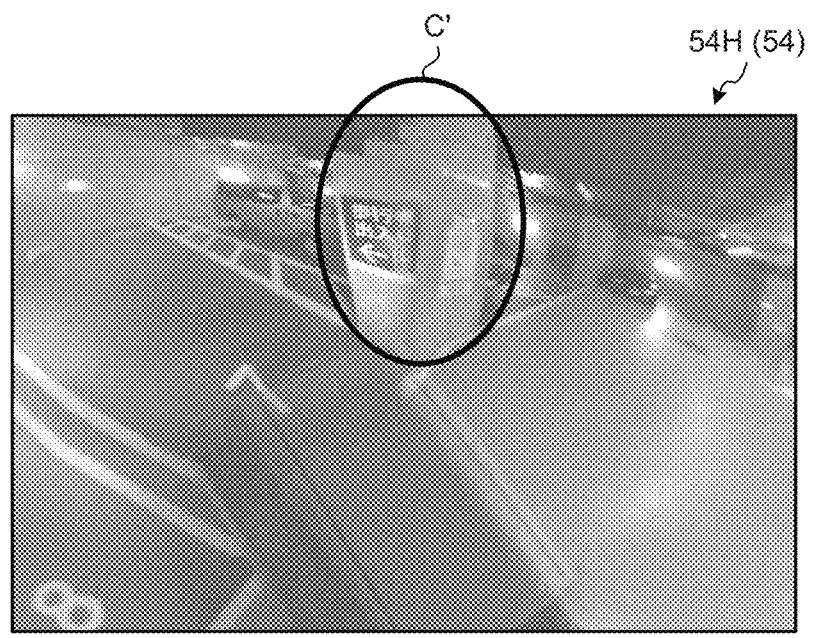
FIG. 19 illustrates an image representing a synthetic image according to the second embodiment.

FIG. 19 illustrates an image representing an example of a synthetic image 54H output by the image processing apparatus 11. The synthetic image 54H is an example of the synthetic image 54. As illustrated in FIG. 19, the image processing apparatus 11 can output the synthetic image 54H by deforming a projection screen (the reference projection screen 40) in accordance with a distance to an actual object.

Accordingly, the image processing apparatus 11 of the present embodiment can provide the synthetic image 54 by using the image capturing unit 12 without using the detector 14. Note that the image processing apparatus 11 may provide the synthetic image 54 by using the detector 14 in addition to the image capturing unit 12.

The image processing apparatus 11 of the present embodiment can be preferably applied to, in particular, a scene where the moving object 2 is traveling at low speed equal to or smaller than a predetermined speed, such as a scene that the moving object 2 is parking.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Note that the image processing apparatus 10 and the image processing apparatus 11 of the above-described first embodiment and the second embodiment can be applied to various apparatuses. For example, the image processing apparatus 10 and the image processing apparatus 11 of the above-described first embodiment and the second embodiment can be applied to a monitoring camera system that processes a video image obtained from a monitoring camera, an in-vehicle system that processes an image of a vehicle exterior surrounding environment, or the like.

According to the image processing apparatus disclosed in this application, it is possible to deform a projection screen in accordance with an object.

What is claimed is:

1. An image processing apparatus comprising:
a processor connected to a memory and configured to function as a deformation unit serving to deform a reference projection screen being a projection screen of a surrounding image of a moving object, the reference projection screen being deformed by using position information in which detection points around the moving object are accumulated and using self-location information of the moving object.

2. The image processing apparatus according to claim 1, wherein the position information includes position information in which the detection points at different timings are accumulated.

3. The image processing apparatus according to claim 2, wherein
the processor is further configured to function as:
an acquisition unit serving to acquire, from a detector device, position information of each of the detection points;

a detection point registration unit serving to register the position information acquired from the detector device into environmental map information; and
a localization unit serving to estimate the self-location information on the basis of the position information registered in the environmental map information and serving to register the self-location information into the environmental map information, and
the deformation unit serves to deform the reference projection screen on the basis of the environmental map information.

4. The image processing apparatus according to claim 3, wherein the processor is further configured to function as a correction unit serving to correct position information of each of the detection points and the self-location information, which are registered in the environmental map information, the position information being corrected by using position information of each of the corresponding detection points that have been acquired at an acquisition timing later than an acquisition timing of the detection points.

5. The image processing apparatus according to claim 1, wherein the deformation unit serves to deform a shape of the reference projection screen on the basis of the detection point closest to the moving object.

6. The image processing apparatus according to claim 5, wherein the deformation unit serves to deform the reference projection screen into a curved surface shape passing through the detection point closest to the moving object.

7. The image processing apparatus according to claim 1, wherein the deformation unit serves to deform the reference projection screen into a shape corresponding to an asymptotic curve of the detection points of each of portions of the reference projection screen.

8. The image processing apparatus according to claim 1, wherein the processor is further configured to function as a projection transformation unit serves to transform a projected image into a virtual viewpoint image viewed in a direction of the deformed projection screen from a virtual viewpoint, the projected image being obtained by projecting the surrounding image onto a deformed projection screen being the deformed reference projection screen.

9. The image processing apparatus according to claim 1, wherein the detection point is detected by a detector device installed in the moving object.

10. The image processing apparatus according to claim 1, wherein the detection point is detected on the basis of the surrounding image.

11. An image processing method implemented by a computer, the image processing method comprising:
deforming a reference projection screen being a projection screen of a surrounding image of a moving object, the deforming being performed by using position information in which detection points around the moving object are accumulated and using self-location information of the moving object.

12. A non-transitory computer-readable recording medium on which a program executable by a computer is recorded, the program instructing the computer to:
deform a reference projection screen being a projection screen of a surrounding image of a moving object, the reference projection screen being deformed by using position information in which detection points around the moving object are accumulated and using self-location information of the moving object.

* * * * *